(12) United States Patent
Kolen et al.

(10) Patent No.: US 10,643,593 B1
(45) Date of Patent: May 5, 2020

(54) PREDICTION-BASED COMMUNICATION LATENCY ELIMINATION IN A DISTRIBUTED VIRTUALIZED ORCHESTRA

(71) Applicant: Electronic Arts Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/431,577

(22) Filed: Jun. 4, 2019

(51) Int. Cl.
*G10H 1/00* (2006.01)
*G06N 20/00* (2019.01)

(52) U.S. Cl.
CPC .......... *G10H 1/0025* (2013.01); *G06N 20/00* (2019.01); *G10H 1/0066* (2013.01); *G10H 2210/026* (2013.01); *G10H 2210/111* (2013.01)

(58) Field of Classification Search
CPC .......... G10H 1/0066; G10H 2220/015; G10H 2220/141; G10H 2220/126; G10H 1/0025; G10H 2210/026; G10H 2210/111; G06K 9/00355; G06N 20/00
USPC .................................................. 84/609, 635
See application file for complete search history.

(56) References Cited

U.S. PATENT DOCUMENTS

| | | | |
|---|---|---|---|
| 5,142,961 A | 9/1992 | Paroutaud | |
| 5,315,060 A | 5/1994 | Paroutaud | |
| 5,648,627 A * | 7/1997 | Usa | G10H 1/0556 706/900 |
| 5,808,219 A * | 9/1998 | Usa | G10H 1/00 84/477 B |
| 6,084,168 A | 7/2000 | Sitrick | |
| 6,297,439 B1 | 10/2001 | Browne | |
| 6,353,174 B1 * | 3/2002 | Schmidt | G10H 1/0058 709/200 |
| 6,482,087 B1 * | 11/2002 | Egozy | A63F 13/12 463/7 |
| 6,898,729 B2 * | 5/2005 | Virolainen | G10H 1/0066 714/4.1 |

(Continued)

FOREIGN PATENT DOCUMENTS

WO   WO 2018/122730   7/2018

*Primary Examiner* — Jeffrey Donels
(74) *Attorney, Agent, or Firm* — Knobbe, Martens, Olson & Bear, LLP

(57) ABSTRACT

Sequence predictors may be used to predict one or more entries in a musical sequence. The predicted entries in the musical sequence enable a virtual musician to continue playing a musical score based on the predicted entries when the occurrence of latency causes a first computing system hosting a first virtual musician to not receive entries or timing information for entries being performed in the musical sequence by a second computing system hosting a second virtual musician. The sequence predictors may be generated using a machine learning model generation system that uses historical performances of musical scores to generate the sequence predictor. Alternatively, or in addition, earlier portions of a musical score may be used to train the model generation system to obtain a prediction model that can predict later portions of the musical score.

20 Claims, 12 Drawing Sheets

(56) References Cited

U.S. PATENT DOCUMENTS

| | | | |
|---|---|---|---|
| 8,119,898 B2 | 2/2012 | Bentson | |
| 8,653,349 B1* | 2/2014 | White | G10H 1/0025 |
| | | | 381/119 |
| 9,418,636 B1 | 8/2016 | Malluck | |
| 9,866,731 B2 | 1/2018 | Godfrey | |
| 10,395,666 B2* | 8/2019 | Cook | G10H 1/366 |
| 2002/0005109 A1 | 1/2002 | Miller | |
| 2002/0134222 A1* | 9/2002 | Tamura | G06F 12/121 |
| | | | 84/622 |
| 2003/0064746 A1 | 4/2003 | Rader et al. | |
| 2003/0094093 A1 | 5/2003 | Smith | |
| 2003/0164084 A1* | 9/2003 | Redmann | G10H 1/0058 |
| | | | 84/615 |
| 2003/0188626 A1 | 10/2003 | Kriechbaum et al. | |
| 2004/0131200 A1 | 7/2004 | Davis | |
| 2005/0260978 A1 | 11/2005 | Rader et al. | |
| 2006/0180005 A1 | 8/2006 | Wolfram | |
| 2007/0028750 A1* | 2/2007 | Darcie | G10H 1/0058 |
| | | | 84/625 |
| 2007/0039449 A1* | 2/2007 | Redmann | G10H 1/0058 |
| | | | 84/609 |
| 2007/0140510 A1 | 6/2007 | Redmann | |
| 2007/0245881 A1* | 10/2007 | Egozy | G10H 1/0016 |
| | | | 84/609 |
| 2007/0261535 A1 | 11/2007 | Sherwani et al. | |
| 2008/0113797 A1* | 5/2008 | Egozy | A63F 13/12 |
| | | | 463/35 |
| 2008/0165980 A1 | 7/2008 | Pavlovic et al. | |
| 2009/0066641 A1 | 3/2009 | Mahajan | |
| 2009/0071315 A1 | 3/2009 | Fortuna | |
| 2009/0320669 A1 | 12/2009 | Piccionelli | |
| 2014/0254828 A1 | 9/2014 | Ray et al. | |
| 2014/0334644 A1 | 11/2014 | Selig et al. | |
| 2015/0143976 A1* | 5/2015 | Katto | A63F 13/211 |
| | | | 84/602 |
| 2015/0179157 A1 | 6/2015 | Chon et al. | |
| 2016/0379611 A1 | 12/2016 | Georges et al. | |
| 2017/0005634 A1 | 1/2017 | Raz et al. | |
| 2017/0092247 A1 | 3/2017 | Silverstein | |
| 2017/0110102 A1 | 4/2017 | Colafrancesco et al. | |
| 2017/0140743 A1 | 5/2017 | Gouyon et al. | |
| 2017/0357479 A1 | 12/2017 | Shenoy et al. | |
| 2018/0271710 A1 | 9/2018 | Boesen et al. | |
| 2018/0322854 A1 | 11/2018 | Ackerman et al. | |
| 2018/0349492 A1 | 12/2018 | Levy et al. | |
| 2019/0018644 A1 | 1/2019 | Kovacevic et al. | |
| 2019/0237051 A1 | 8/2019 | Silverstein | |

* cited by examiner

PREDICTION-BASED COMMUNICATION LATENCY ELIMINATION IN A DISTRIBUTED VIRTUALIZED ORCHESTRA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Current techniques to produce audio, such as for importation in electronic games or video games, generally rely upon large-scale symphonic orchestras led by real-life conductors. The orchestra may be recorded during the performance, and the resulting recording utilized in an electronic game. While using a real-life orchestra may produce a pleasing output, it may be impractical to utilize such an orchestra in all situations in which symphonic audio is desired.

Another example scheme may include utilizing Musical Instrument Digital Interface (MIDI) software to generate audio from an input score. For example, the MIDI software may combine samples of instruments to generate an audio recording. However, these samples may sound mechanical due to the fixed nature of the samples. As an example, while a human player may interpret a portion of a score in a particular way, the MIDI software will combine the samples solely based on the notes in the score. Thus, at present such MIDI software is disfavored. Indeed, for certain movies, electronic games, and so on, a real-life symphony may be considered as a requirement. In this way, there is a need for a technological scheme to improve upon, and thus enhance, computer-based audio generation schemes. Such schemes may democratize the computer-based generation of realistic, and emotionally resonant, music.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method. The method may be implemented by an interactive computing system configured with specific computer-executable instructions. The method may include: receiving, from a user device, a request to generate output associated with a musical performance, wherein the request includes a performance identifier corresponding to the musical performance; selecting a sequence predictor based at least in part on the performance identifier; receiving, from an instrument simulator configured to perform the musical performance, a first entry in a musical sequence corresponding to the musical performance, wherein the first entry occurs at or prior to a first time period; using the sequence predictor, determining a predicted second entry in the musical sequence based at least in part on the first entry in the musical sequence, the predicted second entry associated with a second time period later than the first time period; generating, at the second time period, an audio output based at least in part on the predicted second entry in the musical sequence; adding the predicted second entry in the musical sequence to the first entry in the musical sequence to obtain a first sequence; and using the sequence predictor, determining a first one or more additional predicted entries in the musical sequence based at least in part on the first sequence.

The method of the preceding paragraph can include any combination or sub-combination of the following features: where the predicted second entry comprises a musical note that is predicted to be generated by the instrument simulator; where the predicted second entry comprises a predicted timing of a musical note to be generated by the instrument simulator; where the first entry in the musical sequence is part of a first set of entries in the musical sequence, and where the sequence predictor determines the predicted second entry based at least in part on the first set of entries; where the method further includes: receiving, from the instrument simulator, a second entry in the musical sequence, wherein the second entry is associated with the second time period and is received at a third time period that is later than the second time period; replacing the predicted second entry in the first sequence with the second entry received from the instrument simulator to obtain a second sequence; and using the sequence predictor, determining a second one or more additional predicted entries in the musical sequence based at least in part on the second sequence; where each predicted entry from the first one or more additional predicted entries is added to the first sequence; where the instrument simulator is implemented on a computing system that is separate from the interactive computing system, and where the interactive computing system comprises a second instrument simulator; where the sequence predictor comprises a prediction model generated by applying a set of training data to a model generation system that implements machine learning algorithm; where the method further includes: receiving context information associated with the musical performance, wherein the context information corresponds to a change in the audio output; and modifying the sequence predictor based at least in part on the context information; where the method further includes: using the sequence predictor, determining a predicted third entry in the musical sequence based at least in part on the first entry in the musical sequence, the predicted third entry associated with a third time period later than the first time period; receiving, from the instrument simulator, a third entry in the musical sequence, wherein the third entry is associated with the third time period and is received within a threshold time prior to the third time period; and generating, at the third time period, a second audio output based at least in part on the third entry in the musical sequence and without using the predicted third entry; where the method further includes discarding the predicted third entry in the musical sequence; where the method further includes generating the audio output by at least: applying the predicted second entry to a physical model of a particular instrument at the second time period; and causing the physical model to play a musical note determined to be played at the second time period based at least in part on the musical performance corresponding to the musical identifier; and where generating the audio output based at least in part on the predicted second entry in the musical sequence synchronizes the audio output with a second audio output generated by the instrument simulator, and wherein the instrument simulator is implemented on a separate computing system from the interactive computing system.

Additional aspects of the present disclosure relate to a system comprising an electronic data store configured to store sequence predictors that predict one or more data items within sequences of data items; and a hardware processor of a first computing system in communication with the electronic data store. The hardware processor may be configured to execute specific computer-executable instructions to at least: receive a request to generate output associated with a first application; select a sequence predictor from the electronic data store based at least in part on the request; receive, from a second computing system, a first entry in a data sequence to be synchronized with the output of the first application, wherein the first entry occurs at or prior to a first time period; use the sequence predictor to determine a predicted second entry in the data sequence based at least in part on the first entry in the data sequence, the predicted second entry associated with a second time period later than the first time period; generate, at the second time period, a first output based at least in part on the predicted second entry in the data sequence; add the predicted second entry in the data sequence to the first entry in the data sequence to obtain a first sequence; and use the sequence predictor to determine an additional predicted entry in the data sequence based at least in part on the first sequence.

The system of the preceding paragraph can include any combination or sub-combination of the following features: where the first entry is generated by a second application hosted by the second computing system; where the second application is a second instance of the first application; where the output comprises one or more of audio output, visual output, or haptic output, and where the first application comprises at least one of a video game, an instrument simulator, a virtual orchestra, an educational application, or a content streaming application; where the hardware processor is further configured to execute specific computer-executable instructions to at least: receive, from the second computing system, a second entry in the data sequence, wherein the second entry is associated with the second time period and is received at a third time period that is later than the second time period; replace the predicted second entry in the first sequence with the second entry received from the second computing system to obtain a second sequence; and use the sequence predictor to determine a second additional predicted entry in the data sequence based at least in part on the second sequence; where the hardware processor is further configured to execute specific computer-executable instructions to at least: use the sequence predictor to determine a predicted third entry in the data sequence based at least in part on the first entry in the data sequence, the predicted third entry associated with a third time period later than the first time period; receive, from the second computing system, a third entry in the data sequence, wherein the third entry is associated with the third time period and is received within a threshold time prior to the third time period; and generate, at the third time period, a second output based at least in part on the third entry in the data sequence; and where the hardware processor is further configured to execute specific computer-executable instructions to at least: discard the predicted third entry in the data sequence; and use the sequence predictor to determine a predicted fourth entry in the data sequence based at least in part on the third entry in the data sequence.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements.

The drawings are provided to illustrate embodiments of the subject matter described herein and not to limit the scope thereof.

DETAILED DESCRIPTION

Introduction

Figure 1:
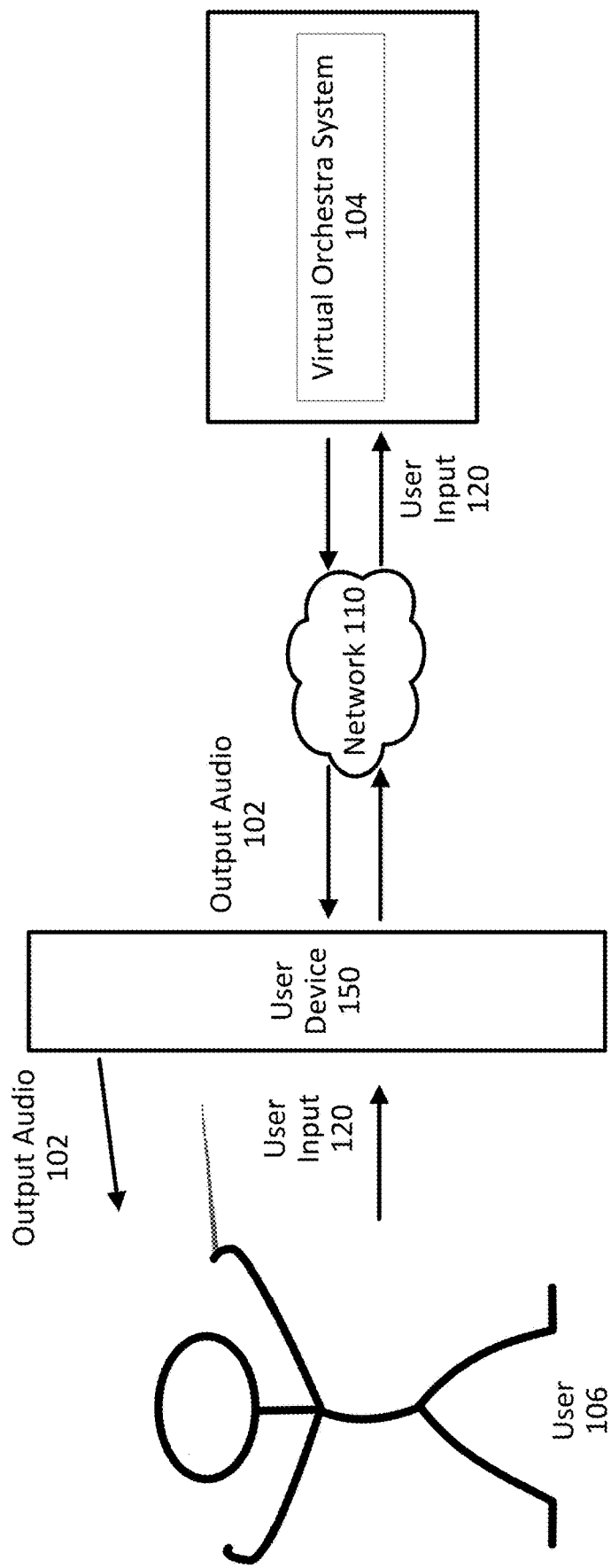
FIG. 1 is a block diagram illustrating a user providing input to a virtual orchestra system as described herein in accordance with certain aspects of the present disclosure.

A virtual orchestra may be used to generate an audio recording of a musical score (herein referred to as a score) based on real-time conductor cues provided by a user to a group of virtual musicians simulated by a system (e.g., a cloud or network-based system, such as the virtual orchestra system 100). The virtual musicians may each play virtual instruments that are modeled on real instruments. Audio may be generated based on the simulated playing being applied to realistic models of each instrument (e.g., physical models, such as simulated physical models). For example, the audio may be generated based on physics first principles. The generated audio associated with each virtual musician may be aggregated and provided to a user device for output. Advantageously, the system may generate the audio in real-time. In this way, a user may conduct the simulated virtual musicians in real-time, and hear corresponding real-time audio via his/her user device. In some cases, the virtual musicians and/or virtual instruments may be distributed among different computing systems.

When different instruments are played as part of an orchestra, the timing of each instrument playing the score is important. For example, if the violins are playing at a different pace or tempo than the flutes, and both instruments are played at a different pace than the cello and/or drums, the resultant audio may be cacophonous. Thus, it is generally desirable that each musician plays the score at the same pace or synchronously. Similarly, it is desirable that each virtual musician plays each virtual instrument synchronously.

In the case where a distributed virtual orchestra is playing the score live or in real-time for output to a user, it is desirable for the virtual musicians to play the virtual instruments synchronously. For each virtual musician to play the virtual instruments synchronously, it is desirable for each virtual musician to monitor the notes or musical sequence being played by each other virtual musician at a given point in time, and the timing of each note being played or generated. Thus, a first computing system hosting a first virtual musician may transmit the identify and/or timing of a note being played to a second computing system hosting a second virtual musician, and vice versa, enabling the two virtual musicians to synchronize performance of the score.

However, in some cases, transmission latency in the network may cause one or more entries in the musical sequence to be delayed. The transmission delay may result in the virtual musicians no longer playing the score synchronously. As a result, the resultant audio output may not match the desired audio output.

Certain aspects of the present disclosure use sequence predictors to predict one or more entries in a musical sequence. The predicted entries in the musical sequence enable the virtual musician to continue playing the score based on the predicted entries when latency results in the first computing system hosting the first virtual musician not receiving the actual entries in the musical sequence from the second computing system hosting the second virtual musician. The sequence predictors may be generated using a machine learning model generation system that uses historical generated musical scores to generate the sequence predictor. Alternatively, or in addition, earlier portions of a musical score may be used to train the model generation system to obtain a prediction model to predict later portions of the musical score.

To simplify discussion, the present disclosure is primarily described with respect to a virtual orchestra. However, the present disclosure is not limited as such and may be applied to other types of applications. For example, embodiments disclosed herein may be applied to video games, educational applications, or other applications where it is desirable to synchronize an output across multiple computing systems in real-time or substantially real-time. In addition, although the present disclosure is primarily described with respect to audio output, it is not limited as such and may be applicable to other types of output that it may be desirable to synchronize. For example, the present disclosure may be applied to graphical output or images, or haptic output.

Further, the use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Certain aspects of a virtual orchestra system that may implement aspects of the present disclosure are described herein and with respect to the figures. Additional aspects of the virtual orchestra system that may be used with the present disclosure is described in U.S. application Ser. No. 16/231,040, which was filed on Dec. 21, 2018 and titled "ENHANCED REAL-TIME AUDIO GENERATION VIA CLOUD-BASED VIRTUALIZED ORCHESTRA," and which is hereby incorporated by reference in its entirety herein.

Example Virtual Orchestra System

FIG. 1 is a block diagram illustrating a user 106 providing input to a virtual orchestra system 104 as described herein in accordance with certain aspects of the present disclosure. As described herein, a user 106 may utilize a user device 150 to cause the generation of output audio 102 associated with a score provided, or otherwise selected by, the user 106. The user 106 may provide user input 120 to the user device 150 associated with conductor cues, and the user device 150 may provide the user input 120 to the virtual orchestra system 104. As will be described, the virtual orchestra system 104 may simulate virtual musicians performing the score and generate the output audio 102 based on the simulations.

In this disclosure, a "conductor cue" may comprise any direction which would be utilized by a musician to play an instrument while performing a particular score. An example of a conductor cue may include an indication of a tempo and beat. In this example, a user may perform a particular movement of his/her hand indicating beats (e.g., up beats, down beats, and so on) and tempo. Another example of a conductor cue may include cueing of certain instruments or groups of instruments. In this example, the user may specify when a particular instrument (e.g., violin), or a group of instruments (e.g., brass instruments, or a user-specifiable group), is to begin playing. Another example of a conductor cue may include an indication of articulation. In this example, the user may adjust tension of his/her hand or hands, or may provide other input (e.g., verbal input, input to a device, and so on).

The virtual orchestra system 104 may be a system of one or more computers, one or more virtual machines executing on a system of one or more computers, and so on. For example, the virtual orchestra system 104 may be a cloud or network-based system, or server system, which is responsive to user input received from one or more user devices. These applications may be accessed via user devices over a network (e.g., the Internet). However, the functionality afforded by the applications may appear to be from locally installed applications. As an example, a web application may provide functionality to edit documents. In this example, a user device may utilize a user interface to provide user input directed to a cloud-based system. The user interface may optionally be generated at least in part by a cloud-based system, and the user input may cause the cloud-based system to update the user interface. In this way, a user may utilize a user device to edit documents via user input provided to a back-end cloud-based system (e.g. hosting the web application).

As will be described in more detail below, the virtual orchestra system 104 may be a distributed system. In some cases, one or more virtual instruments may be hosted or executed on a different physical computing system from one or more other virtual instruments.

Further, the virtual orchestra system 104 described herein may be an example of a system which provides audio generation functionality to users of the system. The virtual orchestra system 104 may thus enable the user 106 to utilize the user device 150 to access the audio generation functionality. As will be described, users may provide scores to be performed by the virtual orchestra system 104. The system 104 may thus service multitudes of users at a same time, for example via simulation of virtual musicians in respective virtual machines, processes, or instances of underlying web applications.

As illustrated in FIG. 1, the user 106 may utilize the user device 150 to provide user input 120 to the virtual orchestra system 104 via a network 110. User input 120 may include adjustment or manipulation of the user's 106 hands, an input device (e.g., a baton), and so on. The user device 150 may be a mobile device (e.g., a tablet, a smart phone), a laptop or other computer, a thin client (e.g., a display with limited computing functionality), and so on. With respect to the mobile device, optionally the mobile device may be a wearable device (e.g., a smart watch or smart glasses). In this example, the user 106 may wear a smart watch, and movement of the smart watch may be utilized as the user input 120. The network 110 may include any type of network including a local area network, a wide-area network, a cellular network, a private network, and the like. In some cases, the network 110 may be or may include the Internet.

The user may utilize the user device 150 to select a particular score to be performed. For example, the user may cause a score to be stored on the user device 150. In this example, the user device 150 may provide the stored score to be provided to the virtual orchestra system 104. As another example, the user may select from amongst a multitude of scores. In this example, the virtual orchestra system 104 may receive the selection, and obtain an associated score (e.g., from a database, from a network location, and so on). Without being constrained by theory, it should be appreciated that the virtual orchestra system 104 may utilize a score provided in any file format. Examples of file formats may include MusicXML (e.g., an XML based file format), MIDI, a .pdf of a score, and so on. With respect to the .pdf, the virtual orchestra system 104 may perform one or more character recognition processes. For example, the system 104 may apply an optical music recognition process to recognize the musical notes, time information, expression information, and so on, which is present within the score. As another example, the system 104 may apply an optical character recognition process to obtain any annotations or notes which may be included in the score. Examples of the virtual orchestra system 104 utilizing annotations or notes are described in more detail below.

The virtual orchestra system 104 may utilize the selected score to simulate virtual musician's performing the score via respective instruments. The system 104 may thus identify the types of instruments which are to be simulated. For example, the score may comprise different portions. Each of these portions may be associated with a particular instrument. As another example, the user 106 may indicate which instruments are to be utilized. For example, using a user interface presented via the user device 150 the user 106 may specify the types of instruments to be simulated and associated quantities. The user device 150 may optionally graphically depict the score. The user 106 may then indicate portions of the score corresponding to different instruments.

Additionally, the user 106 may adjust the type of instruments which are to be simulated by the system 104. For example, a portion of the score may indicate that it is to be performed by a first type of instrument (e.g., oboe, bassoon, violin, and so on). The portion may indicate the first type of instrument via written text, via metadata associated with the score, and so on. The user 106 may provide user input 120 to the user device 150 indicating that the portion is to be performed by a second type of instrument. Advantageously, the user device 150 or virtual orchestra system 104 may optionally transpose the portion to reflect the second type of instrument. Thus, the virtual orchestra system 104 may simulate a virtual musician performing the portion with the second type of instrument.

In addition to causing selection of the instruments to be simulated, the user 106 may select one or more parameters associated with generation the output audio 102. An example parameter may include a particular music hall in which the generated output audio 102 is to be simulated. The user device 150 may enable, via a user interface, selection of a particular music hall. As will be described, the virtual orchestra system 104 may utilize geometry information associated with the selected music hall to generate output audio 102. For example, the system 104 may simulate audio produced by the selected instruments, and then position the simulated audio within the selected music hall. Another example parameter may include positions of the virtual musicians. For example, the user 106 may prefer that certain types of instruments be simulated as being located behind certain other types of instruments. Optionally, the user 106 may indicate particular volume, or loudness, thresholds for each type of instrument. Thus, the user 106 may cause the system 104 to mix the audio associated with the simulated instruments based on these thresholds.

To initiate performance of the score, the user 106 may provide particular user input 120 to the user device 150. For example, the user device 150 may present a representation of virtual musicians or representations of instruments. In this example, the user input may include movement of one or more of the user's 106 hands with respect to the presented representation. Examples of movement may include pointing at the representation, raising the user's hands, and so on. As will be described, the user device 150 may obtain images, or video, of the user 106. In this way, the user device 150 may utilize computer vision techniques to identify that the user 106 is pointing at the representation. Since movement of the user's 106 hands may correspond with actions commonly taken by conductors with respect to real-life orchestras, the user 106 may rely upon commonly established techniques to indicate initiation of a performance. As another example of user input 120, the user 106 may verbally indicate that the score is to be performed. In this example, the user device 150 may utilize an audio input device (e.g., a microphone) to obtain a verbal command associated with initiation. Furthermore, the user 106 may provide user input to indicate arbitrary starting and/or stopping points within the score. As an example, the user 106 may indicate that the score is to be temporarily stopped. The user 106 may then indicate that performance of the score is to be initiated from the temporarily stopped position within the score. As another example, the user 106 may start the performance at the score at the midpoint of the score and then stop the performance prior to the end of the score. The user 106 may then start the performance at the stopping point or begin at any other part of the score.

Subsequent to initiation, the user 106 may provide user input 120 associated with conductor cues to control, at least in part, the virtual musicians. For example, the user 106 may utilize a first hand to indicate tempo, beat, and so on. The user 106 may additionally utilize a second hand to indicate other expressive aspects of musicianship. By way of example, the second hand may point to a particular instrument, or group of instruments, and provide conductor cues (e.g., via movement of the second hand). The virtual orchestra system 104 may then simulate the virtual musicians associated with the particular instrument, or group of instruments, based on the provided conductor cues.

As will be described in more detail below, with respect to at least FIG. 2A, the virtual orchestra system 104 may generate output audio 102 for auditory presentation to the user 106. The virtual orchestra system 100 may simulate actions which real-life musicians may perform with respect to instruments. For example, the virtual orchestra system 104 may utilize machine learning techniques trained based on actions of musicians (e.g., real-world musicians) while playing different scores. Thus, based on the score selected by the user 106, the virtual orchestra system 104 may simulate virtual musicians. As the score proceeds, for example as the system 104 simulates virtual musicians playing notes of the score (e.g., based on a tempo), the system 104 may generate simulated actions associated with the virtual musicians. Example actions may include playing an instrument in a certain technical style, playing successive musical notes with varying speed, loudness, intensity, and so on.

The generated actions may be utilized to generate audio information for respective instruments. For example, the system 104 may simulate actions a violinist may perform while performing a portion of the selected score. To generate audio, the system 104 may then apply the actions to a simulated violin. As will be described, the system 104 may utilize a model of a violin and provide input to the model corresponding to the simulated actions. Thus, if the simulated actions include playing the violin with a particular bowing style, the system 104 may recreate the particular bowing style on the model of the violin. As an example, the system 104 may utilize a model of a bow across modeled strings of a violin. Sound may thus be simulated, and utilizing geometry associated with the modeled violin, resonant sound may be simulated. In this way, the system 104 may generate audio corresponding to the violin.

The above-description references the system 104 simulating actions of one or more virtual musicians, and then applying the simulated actions to respective instruments of the virtual musicians. For example, a simulated action may indicate a particular bowing motion for the virtual orchestra system 104 to simulate. However, it should be appreciated that the system 104 may generate audio utilizing MIDI samples. As is known, there may be a plethora of different MIDI samples corresponding to a same instrument (e.g., hundreds, thousands, and so on). For example, a set of MIDI samples may correspond to an instrument being played in a certain style. The virtual orchestra system 104 may utilize the simulated actions to select, or modify, particular MIDI samples. For example, MIDI samples may be associated with different labels indicating information associated with a playing style.

As an example of adjustment of MIDI samples, the system 104 may simulate an action associated with decreasing a speed associated with transitioning to subsequent musical notes. With respect to a string instrument, the system 104 may adjust MIDI samples to more closely adhere to a virtual musician sliding a finger from a first fret to a second fret based on the decreased speed. As an example of selecting MIDI samples, an action may indicate a particular bowing style of a violin. Thus in this example, the system 104 may utilize MIDI samples corresponding to violins being played in the particular bowing style. In this way, the system 104 may provide an expressiveness, and richness of musical language, which was not possible utilizing pure MIDI-based schemes.

As described above, the virtual orchestra system 104 may additionally utilize the user input 150 when simulating actions of virtual musicians. For example, the user 106 may provide user input 150 associated with a conductor cue to cause an increase in loudness of certain instruments. Thus, the system 104 may correspondingly increase the loudness, intensity, and so on, of the simulated actions.

Figure 2A:
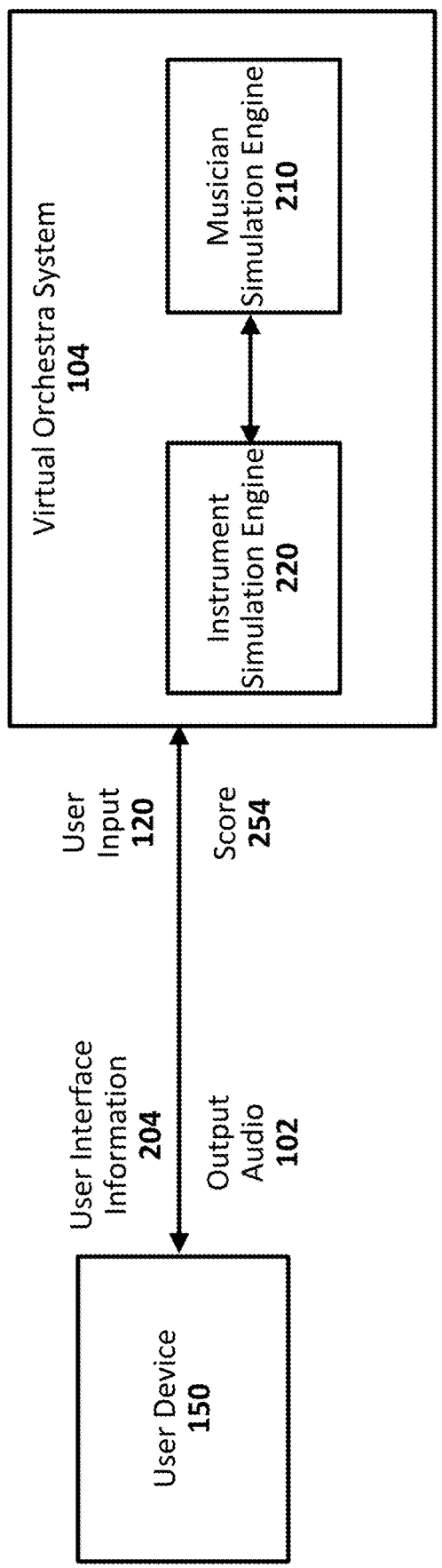
FIG. 2A is a block diagram of an example virtual orchestra system in communication with a user device in accordance with certain aspects of the present disclosure.

FIG. 2A is a block diagram of an example virtual orchestra system 104 in communication with a user device 150. The virtual orchestra system 104, as described above, may generate output audio 102 associated with a score 254 via simulations of performers and instruments. The score 254 may represent a musical piece or a sequence of musical notes that may be played by one or more instruments to generate a song or musical performance.

As illustrated, the virtual orchestra system 104 includes a musician simulation engine 210 and an instrument simulation engine 220. It should be appreciated that these engines 210, 220 may comprise different systems, different virtual machines, different web applications, and so on, which are associated with the virtual orchestra system 104. Optionally, the engines 210, 220 may form part of the same application (e.g., web application), with a first part of a processing pipeline (e.g., the musician simulation engine 210) providing information to a second part of the processing pipeline (e.g., the instrument simulation engine 220).

As described in FIG. 1, the user device 150 may present a user interface to a user associated with conducting virtual musicians. The user interface may be generated, at least in part, by the virtual orchestra system 104. For example, the user device 150 may execute an application that presents, at least in part, user interface features received from the virtual orchestra system 104. Optionally, the application may render the user interface presented via the user device 150, and the user interface may be updated based on information received from the virtual orchestra system 104. As an example, the virtual orchestra system 104 may provide information indicating that a particular graphical element (e.g., a virtual musician) is to be rendered in according to particular information (e.g., the information may indicate a virtual musician is bowing a cello). Thus, the application may render the virtual musician according to the particular style. Optionally, the application may be obtained from an electronic application store (e.g., an 'app'). In some embodiments, the user device 150 may access a web page associated with the virtual orchestra system 104. The system 104 may provide user interface information 204 for rendering via a browser executing on the user device 150. Additionally, user input may be directed to a web page and routed to the virtual orchestra system 104 for processing. In this way, a thin client may be utilized as the user device 150.

The user device 150 may thus be in communication with the virtual orchestra system 104, such as to provide user input 120 and information indicating selection of a score 254. With respect to user input 120, as described in FIG. 1 the user input 120 may reflect conductor cues provided by a user of the user device 150. For example, the user of the user device 150 may indicate that the virtual orchestra system 104 is to initiate performance of the score 254 (e.g., initiate simulation of the virtual musicians). The virtual orchestra system 104 may generate output audio 102 to be presented to the user (e.g., in substantially real-time). Thus, the user may utilize conductor cues to adjust the simulation. As described above, a conductor cue may cause certain virtual musicians to play with greater emphasis, or with a particular emotion.

Optionally, the user device 150 may provide the user input 120 to the virtual orchestra system 104 for processing. In implementations in which the user device 150 comprises a video input device, the user input 120 may be provided as successive frames of captured video of the user. Thus, the virtual orchestra system 104 may utilize computer vision techniques to extract movement of the user's hands or an input device (e.g., a baton). As an example, the system 104 may utilize machine learning techniques (e.g., a neural network) to identify the human's hands. The system 104 may then determine movement of the hands using kinematic modeling of the hands (e.g., the system may track points, or features of the hand such as fingers).

In some embodiments the user device 150 may receive movement information generated by an input device (e.g., a baton, a wearable device). For example, the input device may be in communication with the user device 150 via a wireless or wired connection. In these embodiments, the user device 150 may provide the movement information to the virtual orchestra system 104 for processing. As an example, the movement information may indicate an adjustment in position along one or more axes, acceleration information, and so on.

The user input 120 may optionally be processed by the user device 150 to reflect conductor cues. For example, the user device 150 may analyze images or video of the user, or movement information associated with an input device. The user device 150 may then generate conductor cues based on the analyses. In this way, the user device 150 may provide specific conductor cues to the virtual orchestra system for utilization. Optionally, in lieu of determining conductor cues based on the user input 120, the user of the user device 150 may verbally provide conductor cues. For example, the user may provide a verbal command associated with adjusting a playing style (e.g., 'play legato').

A conductor cue may be determined from user input based on machine learning techniques. For example, movement patterns of real-life conductors may be analyzed and utilized to train machine learning models. An example machine learning model may include a neural network (e.g., a recurrent neural network). In this example model, the neural network may be trained to label certain types of movement. As an example, the neural network may learn to recognize an adjustment in ictus (e.g., an adjustment in a rhythmical stress), adjustment of tension of the hands, and so on, as corresponding to adjustments in articulation. An example of adjustment in articulation may include an increase in tension corresponding to a conductor cue associated with playing staccato. As another example, adjustments in phrasing may be indicated by the user performing overhead arcs.

Optionally, an example machine learning model may be trained based on movement information of one or more features or points of the user or input device. For example, the machine learning model may be trained via adjustments in position, velocity, acceleration, and so on, of these features or points. Examples features or points may include one or more portions of the user's hands (e.g., fingers, palm, back of the hand, and so on). Example features or points of the input device may include a tip of the input device (e.g., a tip of a baton), or points along a length of the input device (e.g., points along the baton).

Thus, specific features or points of the user or input device may be monitored. Movement associated with these features or points may thus be learned to be classified as corresponding to specific conductor cues. However, it should be appreciated that a conductor may indicate conductor cues via other techniques than movement of his/her hand or baton. For example, the conductor may express that an emotion is to be achieved by the virtual musicians via expressions on his/her face. As another example, a tightening or constriction of the hand may correspond to adjustments in playing style. Thus, optionally an indication of emotion may be determined based on an adjustment of the user's face. For example, images or video of the user may be utilized to ascertain adjustments in emotions. A machine learning model may learn to recognize features corresponding to certain emotions. For example, a raising of the eyebrows may correspond to increasing an intensity of playing. Therefore, conductor cues may optionally be based on movement information of the user's hands or input device and other techniques (e.g., adjustments to the user's face, hands, and so on).

In addition to the above-described conductor cues, the user may specify time information associated with the score 254. For example, the user may utilize a certain hand, or a certain input device, to sketch out the tempo to be simulated. The user may also sketch out the beats associated with a time signature of the score 254. In this way, the user may perform adjustments to the tempo to cause the virtual orchestra system 104 to slow down, or increase, a speed at which notes are played by virtual musicians. Similarly, the user may emphasize certain beats more than other beats via adjustments in the user's hands or input device. As an example, in 4/4 time the user may more dramatically move the user's hand or input device when a particular beat in 4/4 time is played. Thus while the user input 120 may indicate a tempo at which the score 254 is to be simulated, for example via continual movement of the user's hands or input device, this tempo may be referred to as a conductor cue. In this way, continuous, or substantially continuous, movement may be utilized to generate discrete conductor cues.

While the above described certain examples of conductor cues, it should be appreciated that additional conductor cues may be utilized. Additionally, the user may cause a training session to be performed prior to the virtual orchestra system 104 simulating the score 254. The training session may enable the user to provide certain preferred movements, adjustments in expressiveness, and so on, and indicate an associated conductor cue. For example, the user may move his/her hand upward sharply and specify that this movement corresponds to an adjustment in articulation. To specify the conductor cue, the user may provide a verbal command indicating the cue. Optionally, the user device 150 may present an adjustment in sound which may be achieved via the conductor cue. For example, the virtual orchestra system 104 may simulate the adjustment. The user may specify a score 254 for the system 104 to simulate during this training period, or the user may indicate that the virtual musicians are to play a repeating short loop of musical notes.

FIG. 2A illustrates the virtual orchestra system 104 as including the musician simulation engine 210 referenced above. The musician simulation engine 210 may simulate actions which each virtual musician may perform during performance of the score 254. These simulated actions may thus be based on a portion of the score 254 each virtual musician is playing. The simulated actions may additionally be based on the received user input 120 from the user device 150. To simulate actions, the musician simulation engine 210 may utilize machine learning models trained based on real-life musicians performing different scores.

It should be appreciated that actions of real-life musicians may be extracted from different sources. For example, video of musicians may be utilized to monitor specific movements of the musician's hands. As another example, musicians may wear gloves that may monitor movement information of their hands. The hand movements may be correlated with specific musical notes being played in a score. Thus, as a musician plays a particular score the movement of the musician's hands may be monitored and utilized to train a machine learning model. Additionally, features of the movement may be learned (e.g., key-features). For example, a speed associated with transitions between notes may be learned. As another example, an extent to which a musical note is allowed to ring may be learned. Subtle variations in playing speed, for example variations which are not existent in the score itself, may be learned. As another example, the machine learning models may learn to recognize techniques by which musicians generally move about a fret board of a stringed instrument. In this example, the machine learning models (e.g., a neural network) may learn constraints associated with such movement (e.g., via video illustrating the movements of the fret board). For example, a machine learning model may learn that a musician may have to adjust a fingering position of a stringed instrument to play a series of musical notes which are followed up by another series of musical notes. A neural network may optionally be utilized to learn such movements and associated constraints.

While utilizing movement of hands may be utilized to learn actions for certain instruments (e.g., a violin, drums), it may not be fully suitable for other instruments. For example, the mouth movements while playing a saxophone may not be learned. As another example, the foot pedal movements of a piano may not be learned. To supplement the extracted hand movements, audio information may be analyzed. For example, mouth movements of musicians playing a saxophone may be inferred via analyses of the sound produced by the saxophone. In this example, a machine learning model may be trained to recognize indicia of such mouth movements via labeled audio corresponding to different produced sounds. Similarly, foot pedal movements may be learned based on analyses of piano audio (e.g., labeled piano audio, such as labels indicating when pedals are utilized).

In addition, the musician simulation engine 210 may be trained with respect to conductor cues. As described above, a conductor cue may cause an adjustment to different aspects of a musician playing an instrument. For example, a conductor cue may cause the musician to increase a tempo, to adjust articulation, and so on. The musician simulation engine 210 may thus learn to simulate actions of musicians based on the occurrence of different conductor cues. As an example of such learning, the engine 210 may be trained utilizing video or audio of musicians. The video or audio may include a first portion, prior to occurrence of a conductor cue, and a second portion subsequent to the occurrence of the conductor cue. Thus, the engine 210 can learn the impact, or change, in the playing style of the musician based on a conductor cue.

Additionally, the musician simulation engine 210 may utilize one or more rules regarding an adjustment caused by occurrence of a conductor cue. For example, a first rule may be associated with changes in tempo. The first rule may therefore indicate that the engine 210 is to simulate a musician playing faster or slower in accordance with the tempo. As another example, a second rule may be associated with adjustments in dynamics. The second rule may therefore indicate that the engine 210 is to simulate a musician playing louder or quieter.

The score 254 may include annotations or notes specified by a user of the user device 150. For example, the user may indicate that a portion of the score 254 is to be played with a certain emotion (e.g., sadness). The musician simulation engine 210 may learn a playing style associated with these emotions. For example, audio or video of musicians may be utilized along with labels indicating emotions being expressed via the musicians' playing to train the engine 210. Thus, the engine 210 may learn that a 'sad' emotion generally causes musicians to adjust an articulation associated with their playing.

In this way, the musician simulation engine 210 may thus simulate actions for virtual musicians. These simulated actions may be utilized by the instrument simulation engine 220 to generate audio. For example, the generated audio may comprise waveforms to be aggregated by the system 104 and provided to the user device 150 as output audio 102. The instrument simulation engine 220 may optionally generate waveforms utilizing modeled versions of instruments. For example, the engine 220 may access physical models of instruments. These physical models may be associated with information (e.g., metadata) indicting properties of features of the instruments. Example properties may include a type of material which is utilized to construct the instrument. The type of material may be utilized to inform generation of the waveforms. For example, the engine 220 may model the effect which different materials have on sound. The instrument simulation engine 220 may also utilize MIDI samples or synthesizers to generate waveforms. For example, the engine 220 may utilize violin MIDI samples or synthesizers to generate waveforms while simulating a virtual musician playing a violin.

The instrument simulation engine 220 may use the simulated actions as controls to the instruments. With respect to using physical models of instruments, the simulated actions may be recreated on the physical models. For example, simulated actions for a violin may include pressing downward on different frets while a bow is run across the violin according to a particular style. With respect to using MIDI samples or synthesizers, the engine 220 may select particular samples based on the actions. As an example, a simulated action may include an overblow playing style technique applied to a woodwind. In this example, the engine 220 may select MIDI samples of a woodwind with such a technique applied. Additionally, the engine 220 may adjust particular samples based on the actions. For example, a simulated action may include a bending of a string of a guitar. In this example, the engine 220 may adjust a MIDI sample to mimic the bending. For example, the engine 220 may adjust the MIDI sample in a frequency domain (e.g., the sample may be shifted upwards, in accordance with known frequency adjustments caused by bending). As another example, the engine 220 may utilize machine learning techniques to adjust the MIDI sample.

The instrument simulation engine 220 may therefore generate audio corresponding to each of the simulated instruments performing the score 254. The generated audio may then be combined by the virtual orchestra system 104 to create output audio 102 for auditory presentation via the user device 150. As described above, the generated audio corresponding to the simulated instruments may be simulated as occurring within a same music hall. Thus, the combined audio may have added realism and more closely adhere to a sound achievable by real-world instruments.

The output audio 102 associated with the score 254 may be stored (e.g., via virtual orchestra system 104). As described above the stored output audio may represent an audio recording. The stored audio may then be accessed by the user device 150. For example, the system 104 may store generated output audio associated with multitudes of scores. A user of the user device 150 may request the stored output audio, for example subsequent to completion of the score 254. Optionally, upon completion of performance of the score 254, the system 104 may push a stored version of the output audio 102 to the user device 150. The stored output audio may be stored according to different formats (e.g., compressed or uncompressed formats) and optionally stored as stereo, surround sound, and so on. Further, the stored output audio may be stored in a volatile or non-volatile memory.

Figure 2B:
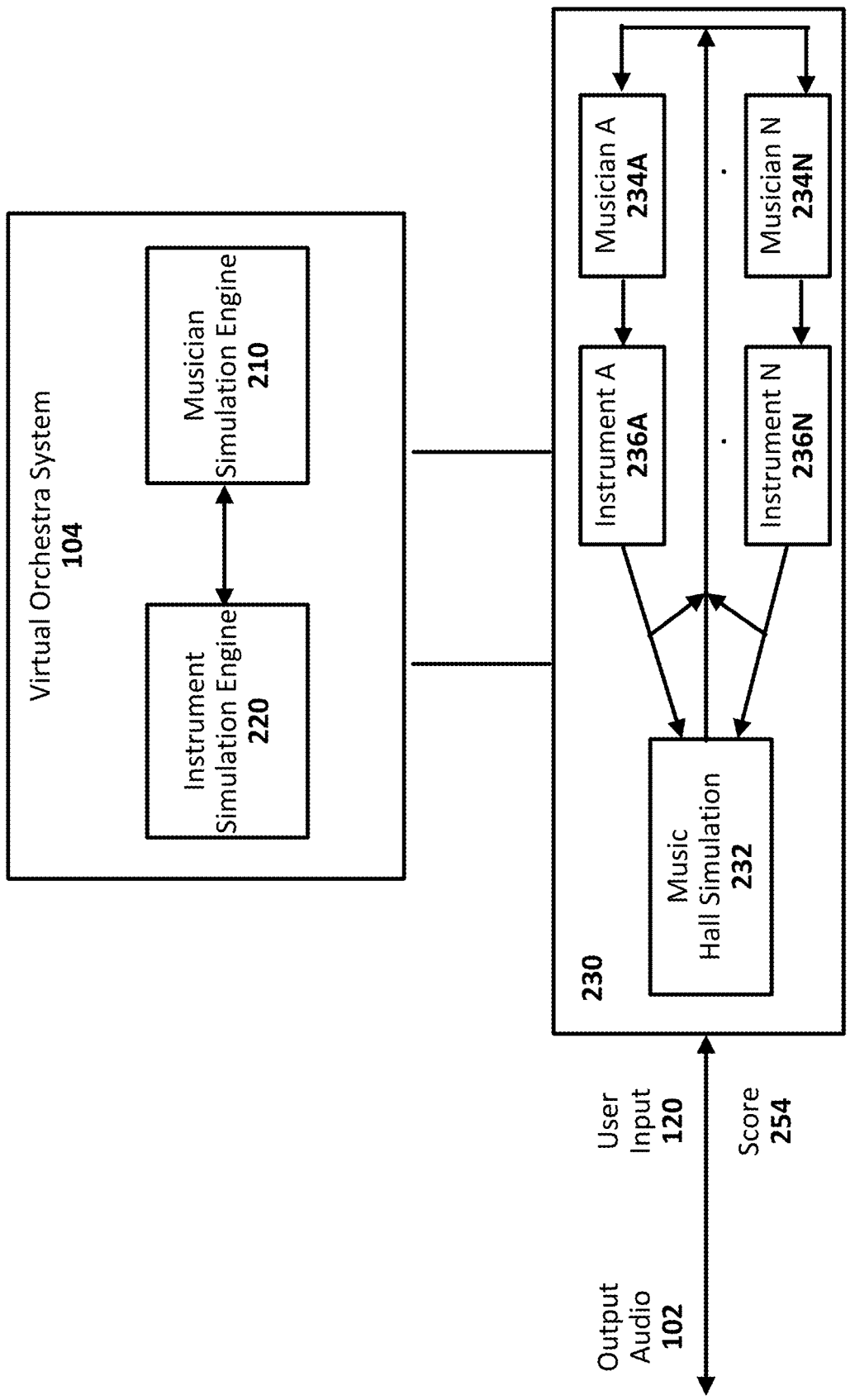
FIG. 2B is another example block diagram of the virtual orchestra system in accordance with certain aspects of the present disclosure.

FIG. 2B is another example block diagram of the virtual orchestra system 104. FIG. 2B includes a block diagram 230 representing the different simulations being generated by the virtual orchestra system 104. As illustrated in block diagram 230, the virtual orchestra system 104 may receive user input 120 (e.g., conductor cues) and a score 254 to be performed. This received information may be provided to the virtual musicians A-N 234A-N. As described in FIG. 2A, the musician simulation engine 210 may simulate actions associated with these virtual musicians 234A-N. The simulated actions may then be provided to respective instruments A-N 236A-N, for example as control information to cause the system 100 to generate waveforms associated with the instruments 236A-N.

As further illustrated, a music hall simulation 232 block is included in block diagram 230. The music hall simulation 232 may receive the waveforms associated with the instruments 236A-N, and then aggregate them to be provided as output audio 102. The virtual orchestra system 104 may simulate specific music halls or other venues that may support a musical performance. Additionally, the virtual orchestra system 104 may utilize a template of music hall. For example, the template may correspond to an average, or typical, music hall. Optionally, a user may provide a physical model of a music hall (e.g., a three-dimensional model). The user may also specify locations at which the instruments are to be included within the model. Thus, the music hall simulation block 232 may aggregate the waveforms based on the provided music hall.

Furthermore, the music hall simulation block 232 may provide the aggregated audio to each of the virtual musicians 234A-N. For example, the virtual musicians 234A-N may receive a representation of the entire performance. In some cases, the representation may be a lower fidelity representation. Optionally, the musician simulation engine 210 may utilize the lower fidelity representation as an input when simulating actions of the virtual musicians 234A-N. It should be appreciated that during a real-world symphonic performance, the musicians may feed, or otherwise play, off of each other. While a conductor may provide conductor cues for interpretation by the musicians, the musicians may also utilize the overall sound being produced by remaining musicians. Similarly, the musician simulation engine 210 can utilize the aggregated audio from the music hall simulation 232 to adjust simulated actions. For example, the engine 210 may adjust an articulation being played by a virtual musician based on the aggregated audio. As another example, the engine 210 may ensure that a same tempo, beat emphasis, and so on, is being maintained by the virtual musicians. To adjust the simulated actions, the system 104 may utilize machine learning techniques trained on large-scale orchestra musician interactions.

Example Distributed Virtual Orchestra System

Figure 3:
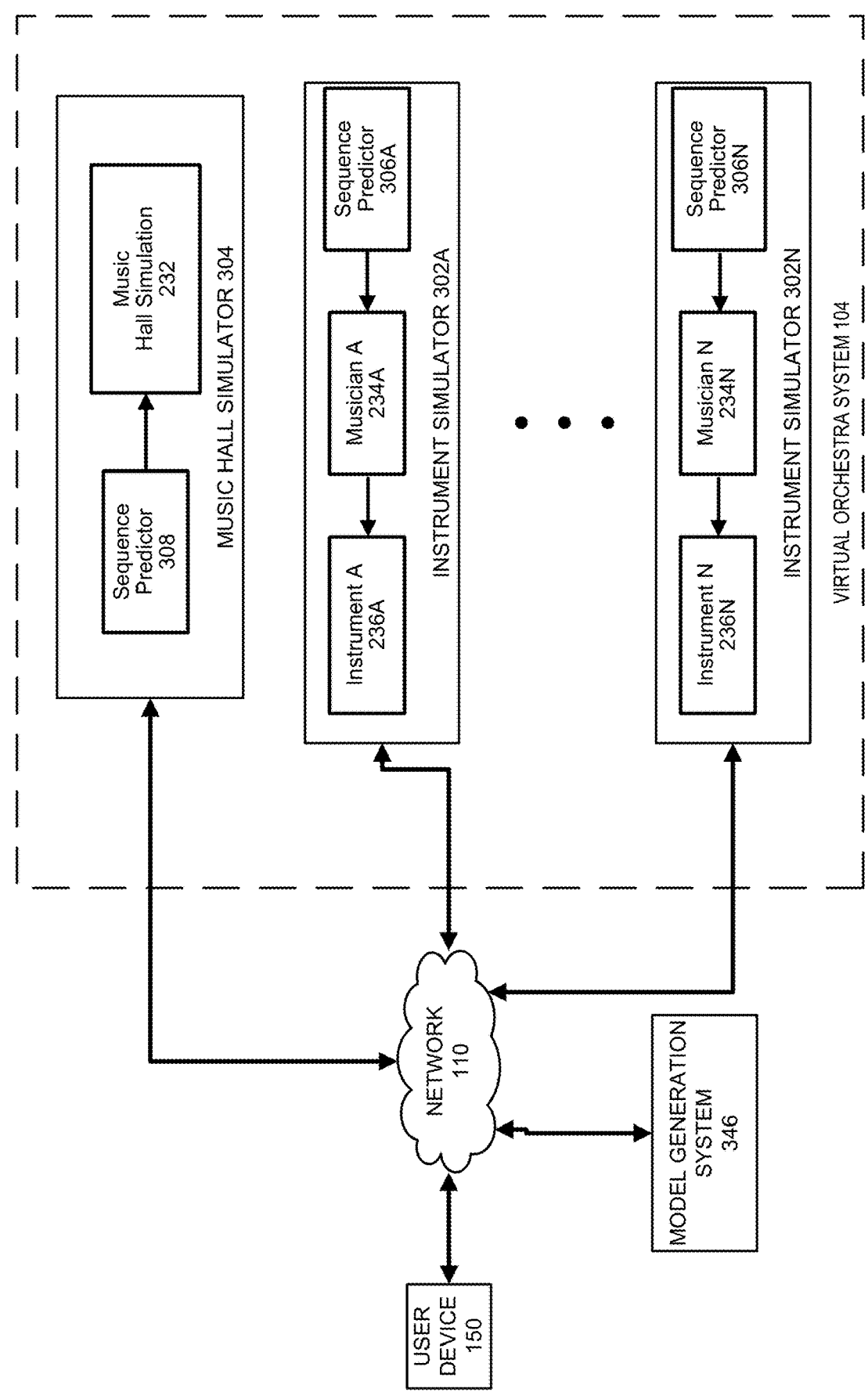
FIG. 3 is a block diagram of an example of a distributed virtual orchestra system in accordance with certain aspects of the present disclosure.

FIG. 3 is a block diagram of an example of a distributed virtual orchestra system 104 in accordance with certain aspects of the present disclosure. The virtual orchestra system 104 may include the features previously described above with respect to the virtual orchestra system 104. Further, as illustrated in FIG. 3, the virtual orchestra system 104 may be a distributed system with one or more of the instruments A-N 236A-N hosted by different instrument simulators 302A-302N. Each of the instrument simulators 302A-302N may be implemented by or hosted by a different computing system. The instruments simulators 302A-302N may each be configured to simulate the actions of a musician and the musician's instrument via the inclusion of one or more of the virtual instruments 236A-236N and one or more of the virtual musicians 234A-234N.

Each of the virtual instruments 236A-236N and/or virtual musicians 234A-234N may be configured to play the same score or musical sequence. However, much like a real orchestra, at least some of the different virtual instruments 236A-236N and/or virtual musicians 234A-234N may play different portions of the musical score, play portions of the musical score differently, or play portions of the musical score in a manner that is determined based at least in part on how other virtual instruments and/or virtual musicians of the virtual orchestra system 104 are playing the musical score. The differences between how the virtual instruments 236A-236N and/or virtual musicians 234A-234N play the musical score, and the interplay between the virtual instruments 236A-236N and/or virtual musicians 234A-234N play of the musical score may facilitate playing the musical score in a manner desired by the user.

To achieve the desired play of the musical score, it is often desirable for each musician to hear the other musicians play the musical score. This enables each musician to time the playing of the musical score. Musicians often achieve this timing by practicing and learning each other's play style and by reacting to each other in real time. Further, the music played around the musician often affects how the music played by the musician sounds. For example, the audio played by nearby instruments may affect the reverberation of the musician's instrument.

To simulate and achieve the above affects with the virtual orchestra system 104, it is desirable for each instrument simulator 302A-302N to receive information about the actions being performed and the output being generated by each other instrument simulator 302A-302N. Each instrument simulator 302A-302N may receive data packets that can include any information that may affect the performance of other instruments simulators 302A-302N. For example, the data packets may include one or more pieces of information relating to: a musical note being played, a timing of the musical note being played, a length of time that the musical note is being played or being sustained, and the like.

Further, as previously described, although the present disclosure primarily discusses aspects relating to a virtual orchestra, the present disclosure is not limited as such and can be applied to other distributed systems that may operate synchronously, at least in part, and/or at least partially in real-time. For example, aspects of the present disclosure may apply to multiplayer video games, educational applications, and other multi-user applications or other distributed applications. In some such cases, the data packets may include one or more pieces of information that facilitate synchronizing various aspects of the application. For example, in the use case of a video game, the data packets may include an identity of actions performed by another user and the timing of the actions. This information may be used to cause a character being controlled by the user to behave synchronously on the user's computer as well as another user's computer. Thus, for example, if a first user on a first computer system causes a playable character to walk across the screen, the second user on a second computer system may observe the playable character walking across the screen.

When utilizing multiple computing systems to execute an application, for example, a distributed system of a virtual orchestra, or when multiple computing systems are enabling users to interact as part of an inter-dependent real-time experience, it is important to minimize or eliminate latency. Latency may cause inter-related actions to lose synchronization. For example, if the timing of musician A 234A playing a second note is related to the timing of musician N 234N playing a first note (e.g., at the same time, directly after, at an overlapping time period, etc.), the instrument simulator 302A should receive sufficient notice of the first note played by the musician N 234N so as to coordinate or synchronize playing of the second note. Latency in the communication between the instrument simulator 302A and 302N may impact the timing of the note playing by the musician A 234A and, consequently, may alter the audio output of the musical score generated by the virtual orchestra system 104.

Similarly, latency in communication between computing systems hosting instances of a video game may result in actions performed by a character at one computing system being delayed at another computing system. Thus, for example, a character walking along a path may continue to walk along the path on the display of a first computer, but pause mid-walk on the display of the second computer due, for example, to the latency of the walk command being received by the second computer. Once the walk command is received, the character may be delayed in movement, or may jump forward on the path due to later commands being received. Thus, the result of the delayed commands may cause an unnatural output (e.g., jumpy graphics instead of smooth movement of the character).

The latency may be introduced by delays in communication across the network 110. These delays may be related to available bandwidth, the distance between hops on the network 110, the distance between instrument simulators 302A-302N, configuration differences between computing systems, and/or any other causes for latency in communication. Certain aspects of the present disclosure reduce or eliminate issues relating to the latency by using a sequence predictor.

Each of the instrument simulators 302A-302N may include one or more sequence predictors 306A-306N. In some aspects, each instrument simulator 302A-302N may include one less sequence predictor as there are number of instrument simulators, number of virtual musicians, or number of virtual instruments. Each sequence predictor 306A-N may predict one or more entries in a data sequence based at least in part on previous entries in the data sequence. Further, the sequence predictor may predict one or more entries in the data sequence based at least in part on an identity of the data sequence and/or the system generating the data sequence. For example, if the data sequence is related to a particular musical score, is being generated by a particular virtual musician, and/or is being generated by a particular virtual instrument, the sequence predictor may predict one or more entries in the data sequence. Advantageously, by using data other than previous entries in the data sequence, the sequence predictor can predict the first entry or early entries in the data sequence. Upon receipt of entries in the data sequence, the sequence predictor can using the received entries in the data sequence to predict further entries. Each entry in the data sequence may be associated with one or more musical notes of a musical score played on a particular virtual instrument.

By using the sequence predictor to predict an entry in the data sequence, an instrument simulator can continue to play the musical score without waiting for receipt of a particular entry in the data sequence. For example, if the playing of a first note by the musician 234A is contingent on the timing of a second note played by the musician 234N, a delay in receipt of a data packet associated with the second note may cause a pause or other artifact relating to the delay in the receipt of the data packet. By using the predicted entry in the sequence associated with the second note played by the musician 234N, the musician 234A can proceed with playing the first note at a particular time on the basis of the predicted entry. Thus, the effect of the delayed data packet may be reduced or eliminated. Although the predicted entry may not always be accurate, it is often desirable to proceed on the basis of the predicted entry rather than pausing to receive the correct entry in the data sequence. For example, a note played slightly ahead or behind when it should have been played is preferred to pausing until a data packet associated with the interrelated note is received. Similarly, in a video game use-case, having a character performing a particular action (e.g., continuing to walk, turning, or shooting, etc.) may be preferred to the character pausing while a data packet is received. For example, a walking character that suddenly pauses (e.g., enters a zombie-like state) may be more noticeable or jarring than a walking character that continues to walk.

Each of the sequence predictors 306A-306N may be, or may include, a prediction model generated by a machine learning algorithm or process. The prediction models may be generated by a model generation system 346. The model generation system 346 can use one or more machine learning algorithms to generate one or more prediction models or parameter functions. One or more of these prediction models may be used to determine an expected value or occurrence based on a set of inputs. For example, a prediction model can be used to determine an expected note in a musical score played by a virtual instrument 236A, or the expected timing that the note is played based on one or more inputs to the prediction model, such as, for example, historical performances of the musical score, performances of other musical scores, characteristics of the virtual instrument 236A, characteristics of the virtual musician 234A, user attributes or preferences of the user 106 interacting with the user device 150, and the like. In some cases, the prediction model may be termed a prediction model because, for example, the output may be or may be related to a prediction of an action or event, such as a prediction of the timing of a note played by the virtual musician 234A. A number of different types of algorithms may be used by the model generation system 346. For example, certain embodiments herein may use a logistical regression algorithm. However, other algorithms are possible, such as a linear regression algorithm, a discrete choice algorithm, or a generalized linear algorithm.

The machine learning algorithms can be configured to adaptively develop and update the models over time based on new input received by the model generation system 346. For example, the models can be regenerated on a periodic basis in response to new occurrences of playing the musical score, or as new musical scores are played. The model generation system 346 is described in more detail herein. After a model is generated, it can be provided to a sequence predictor 306A-306N to predict an entry in the musical sequence associated with the musical score.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some aspects, the virtual orchestra system 104 may further include a music hall simulator 304. The music hall simulator 304 may include a music hall simulation 232. As previously described, the music hall simulation 232 may receive waveforms from the virtual instruments 236A-236N and aggregate them to generate a virtual orchestra output. As with each of the instrument simulators 302A-302N, the music hall simulator 304 may further include one or more sequence predictors 308. In some cases, the music hall simulator may include a sequence predictor for each of the instrument simulators 302A-302N, each of the instruments 236A-236N, or each of the musicians 234A-234N. The sequence predictor 308 can predict one or more entries in the musical sequence associated with the musical score for one or more of the instrument simulators 302A-302N, instruments 236A-236N, or musicians 234A-234N.

Example Sequence Predictor Operation

Figure 4:
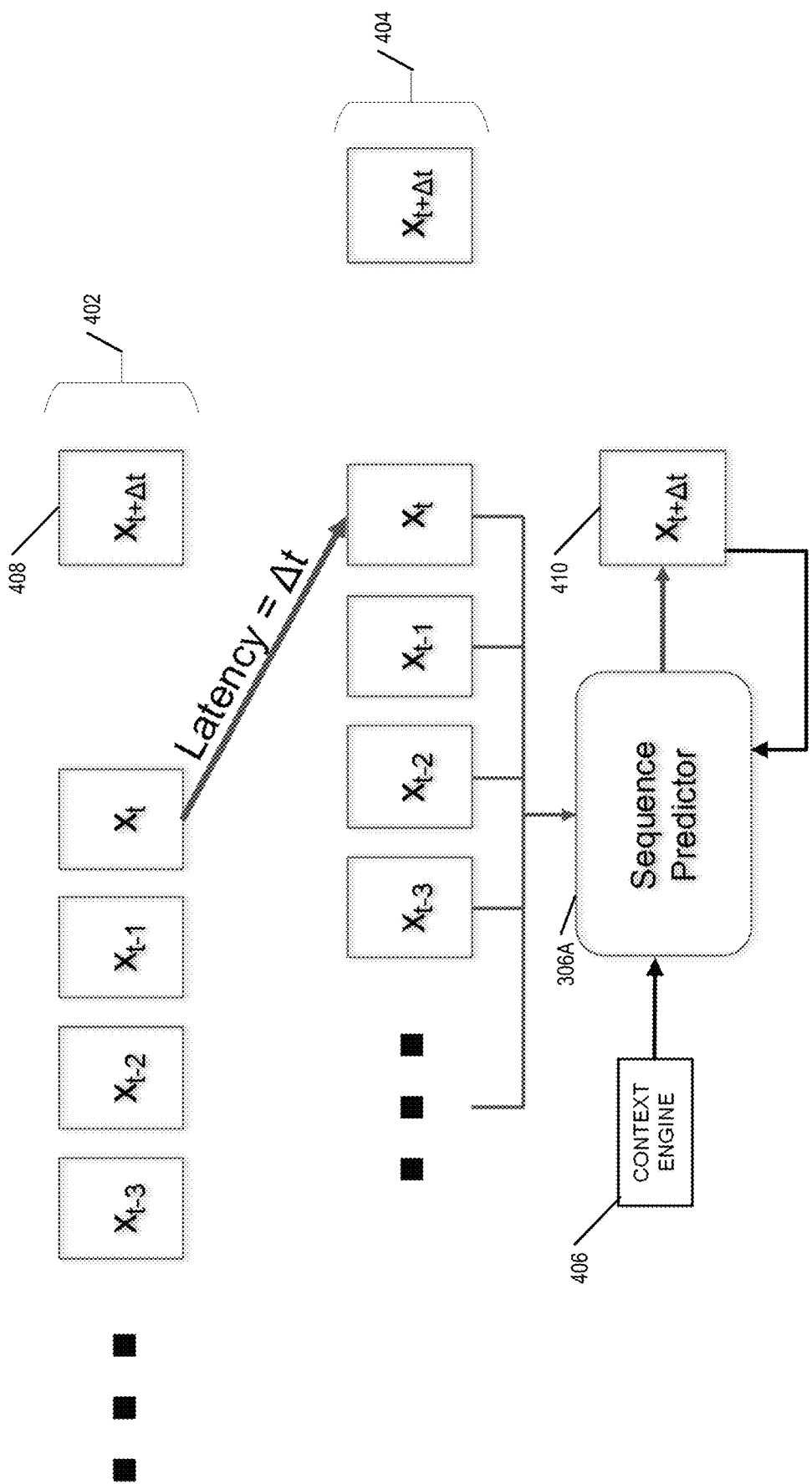
FIG. 4 is a block diagram illustrating operation of a sequence predictor in accordance with certain aspects of the present disclosure.

FIG. 4 is a block diagram illustrating operation of a sequence predictor 306A in accordance with certain aspects of the present disclosure. A sequence generator, such as the virtual musician 234N, may generate a sequence of musical notes associated with a musical score. This sequence of notes, or data associated with the sequence of notes, may be represented by the time-based sequence 402. This time-based sequence may be transmitted by the instrument simulator 302N to a second instrument simulator 302A, which may include the virtual musician 234A, which may generate a sequence of musical notes associated with the musical score. The sequence generated by the virtual musician 234A may be further based at least in part on the sequence generated by the virtual musician 234N, and vice versa. For example, the timing of notes generated by the virtual musician 234N may affect the timing of notes generated by the virtual musician 234A, and vice versa. Thus, as previously described, it may be desirable to reduce or eliminate the latency between the generation of an entry in the sequence 402 and the receipt of the entry at the instrument simulator 302A hosting the virtual musician 234A. The sequence received by the at the instrument simulator 302A may be represented by the time-based sequence 404.

The time-based sequence 404 may be the same as the time-based sequence 402, but may be delayed by some amount of latency Dt. The delay Dt in receiving the musical sequence, or other data sequence, generated by the virtual musician 234N may delay performance of a musical sequence by the virtual musician 234A. To prevent or eliminate the delay, as illustrated in FIG. 4, the portion of the sequence received up to time t (e.g., $X_t$, $X_{t-1}$, $X_{t-2}$, etc.) may be provided to the sequence predictor 306A, which may predict a later entry in the musical sequence (e.g., $X_{t+Dt}$). Accordingly, if the receipt of entry 408 is delayed, an entry 410 predicted by the sequence predictor 306A may be used to facilitate the instrument simulator 302A continuing its performance of the selected musical score. In some cases, a portion of the sequence prior to time t may be provided to the sequence predictor 306A. This sequence may be less than all of the entries that have occurred prior to time t.

In some aspects, the entry 410 may be fed back to the sequence predictor 306A. In some such aspects, the sequence predictor 306A may use the entry 410 to predict additional entries in the musical sequence being played by the virtual musician 234N. In some aspects, upon receipt of the corresponding entry 408 from the instrument simulator 302N, the entry 410 may be discarded or replaced by the entry 408 for purposes of predicting additional entries in the musical sequence. It should be understood that although the entry 408 replaces the predicted entry 410, the predicted entry 410 may have been used to facilitate the instrument simulator 302A performing a portion of the musical sequence associated with the musical score prior to receipt of the entry 408.

In some aspects, the sequence predictor 306A, or a prediction model implemented by the sequence predictor 306A, may vary based on the musical score to be performed. For example, the instrument simulator 302A or the virtual orchestra system 104 may receive an identifier associated with the musical score. Based on the received identifier, the instrument simulator 302A or the virtual orchestra system 104 may load or select a prediction model associated with the musical score. In some such cases, each musical score may be associated with its own prediction model. Alternatively, a particular set of musical scores may be associated with a particular prediction model, while other musical scores may be associated with other prediction models.

In some cases, different contexts may be associated with different prediction models. Alternatively, or in addition, a particular prediction model may be modified based at least in part on a context associated with the musical score or a particular performance of the musical score. This context information may be provided to the sequence predictor 306A by the context engine 406. Alternatively, the context engine 406 may select or modify the prediction model based on determined or provided context information.

The context information can include any type of information that might modify the performance of the musical score. For example, the context information may include user preferences for the performance of the musical score (e.g., to play the musical score with particular types of instruments, using a particular octave, or particular notes, a particular tempo, etc.), bandwidth available, speed of the network 110, play style of the virtual musician, the physical model of the virtual instrument, and the like.

Example Prediction-Based Synchronization Process

Figure 5A:
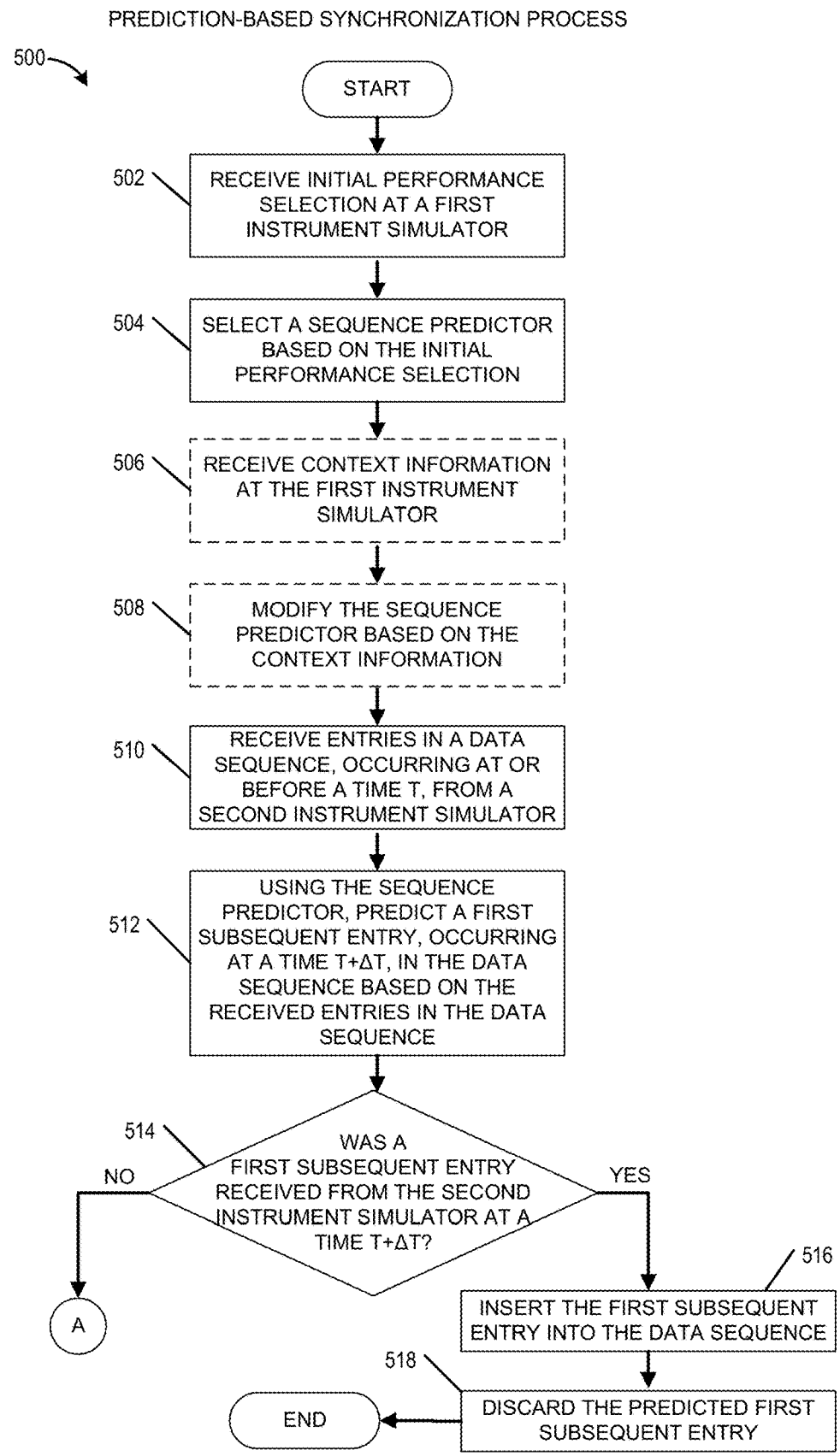
FIG. 5A is a first portion of a prediction-based synchronization process in accordance with certain aspects of the present disclosure.
Figure 5B:
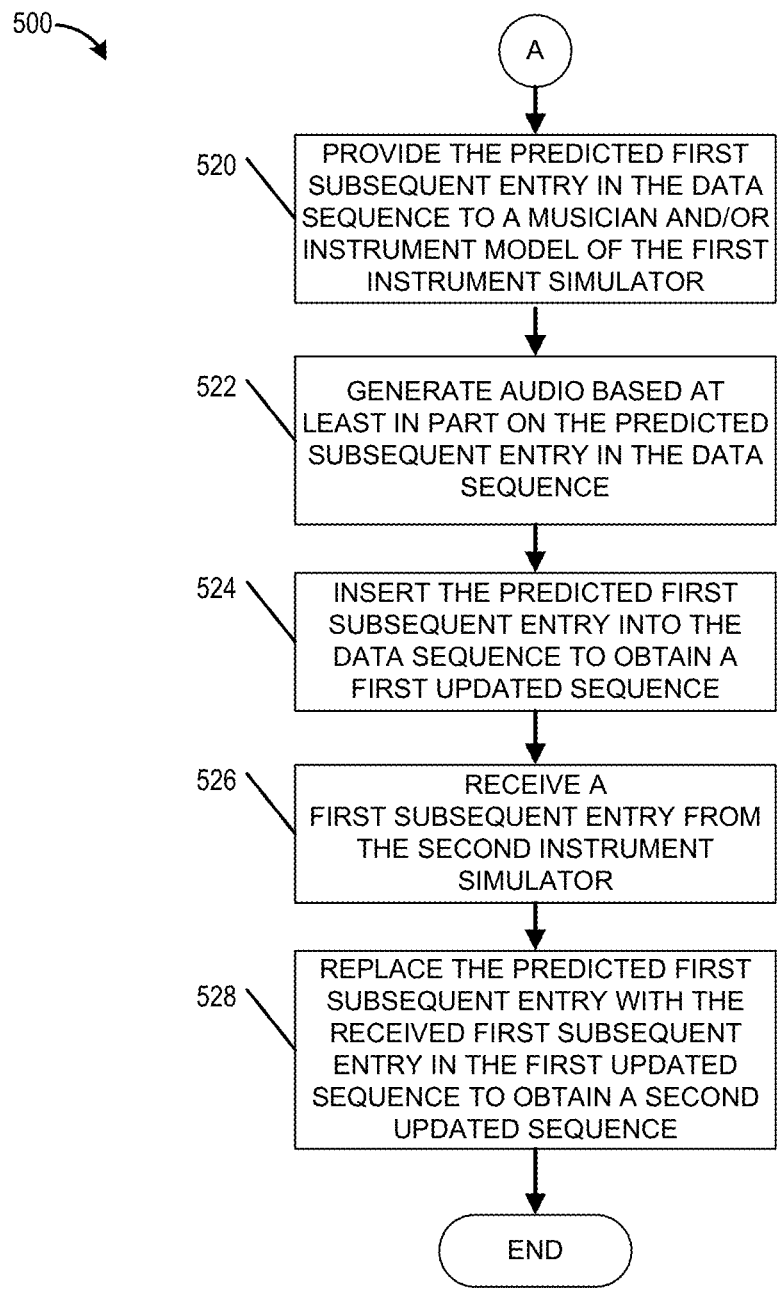
FIG. 5B is a second portion of the prediction-based synchronization process in accordance with certain aspects of the present disclosure.

FIG. 5A is a first portion of a prediction-based synchronization process 500 in accordance with certain aspects of the present disclosure. A second portion of the process 500 is presented in FIG. 5B. FIG. 5B should be understood to continue the process 500 from FIG. 5A, which has been divided to simplify display. The process 500 can be implemented by any computing system that can generate one or more predictions of a sequence being generated by another computing system to facilitate synchronization of sequences between at least two computing systems. The process 500, in whole or in part, can be implemented by, for example, a virtual orchestra system 104, one or more sequence predictors 306A-N, 308, or a user device 150, among others. Although any number of systems, in whole or in part, can implement the process 500, to simplify discussion, the process 500 will be described with respect to particular systems.

Although the process 500 is primarily described with respect to synchronizing musical sequences of a virtual orchestra, it should be understood that the process 500 may be used to synchronize other sequences, such as visual or graphical sequences between a plurality of computing systems implementing one or more instances of a video game. As such, the process 500 may, in whole or in part, be implemented by one or more computing systems hosting portions of an instance of a video game (including a user computing system and/or a server computing system), one or more computing systems hosting one or more instance of a video game, or one or more computing systems hosting other applications (such as educational applications) that may attempt to synchronize one or more sequences. Further, although aspects of the process 500 may be applicable for non-real-time use-cases, the process 500 is often utilized for real-time or near real-time use-cases where a delay or latency may result in an undesirable output (e.g., music out of synch, or characters moving out of synch, etc.).

The process 500 begins at block 502 where the virtual orchestra system 104 receives an initial performance selection at a first instrument simulator 302A. The initial performance selection may be part of a request to generate audio associated with a musical score. For example, the initial performance selection may be an identity of the musical score. Further, the initial performance selection may include additional information, such as an identity of an instrument that the first instrument simulator 302A is to simulate. In other cases, the block 502 may include a computing system receiving an identity of an application to execute. For example, the block 502 may include receiving an identity of a videogame to execute or an account of a user by a video game to load.

At block 504, the first instrument simulator 302A selects a sequence predictor 306A based on the initial performance selection. In some cases, each musical score, or some set of musical scores, may be associated with different sequence predictors. In some such cases, the particular sequence predictor 306 a may be selected from a set of sequence predictors based at least in part on the identity of the musical score to be performed. The first instrument simulator 302A may attempt to synchronize its performance of the musical score to, or otherwise base its performance of the musical score on, a performance by one or more other instrument simulators. Thus, in some cases, the particular sequence predictor 306A may be selected based at least in part on particular instruments to be simulated by one or more other instrument simulators rather than the instrument being simulated by the instrument simulator 302A. For example, while the first instrument simulator 302A may be configured to simulate a violin, the sequence predictor 306A to be selected may be associated with a flute to be simulated by another instrument simulator. In some aspects, the first instrument simulator 302A may select or load a sequence predictor for each additional instrument simulator to be involved in generating the performance of the musical score.

Optionally, at block 506, the first instrument simulator 302A receives context information associated with the performance of the musical score. As previously described, the context information can include any type of information that might modify the performance of the musical score. For example, the context information may include a desired tempo or particular octave for the musical score.

Optionally, at block 508, the first instrument simulator 302A modifies the sequence predictor 306A based at least in part on the context information received at the block 506. Modifying the sequence predictor 306A may include adjusting the weights applied to various parameters used to predict one or more entries in a receive data sequence. Alternatively, or in addition, modifying the sequence predictor 306A may include selecting a different sequence predictor based on the context information.

At block 510, the first instrument simulator 302A receives entries in a data sequence occurring at or before a particular time T from a second instrument simulator 302N. The block 510 may include receiving one or more entries in the data sequence. In some cases, the block 510 may include receiving no entries in the data sequence. For example, at a time zero when the musical score is first beginning to be performed, no entries in the data sequence may have yet been received. As another example, at some time later than zero when performance of the musical score has already begun, entries in the data sequence associated with a particular instrument that is not yet scheduled to begin its part in the performance of the musical score may not yet have been received.

In some cases, the block 510 includes receiving all entries within a data sequence prior to the particular time T. In other cases, the block 510 may include receiving a subset of entries occurring prior to a time T. For example, the block 510 may include receiving the most recent five or ten entries from the second instrument simulator 302N. The entries received in the data sequence may be representations of actions performed by the second instrument simulator 302N and/or may be information associated with the performance of actions by the second instrument simulator 302N. For example, the entries received in the data sequence may be an identity of the notes played by the second instrument simulator 302N. Alternatively, or in addition, the entries received in the data sequence may be timing information (e.g., when a note was played, or for how long a note was played, etc.) for each note played by the second assignment simulator 302N, a style in which the note was played, an octave within which the note was played, and the like. Further, the entries received in the data sequence may include any information that may be usable by the first instrument simulator 302A to facilitate the first instrument simulator 302A synchronizing, or otherwise maintaining its interdependence with, its performance of the musical score with the performance of the musical score by the second instrument simulator 302N.

At block 512, using the sequence predictor 306A, the first instrument simulator 302A predicts a first subsequent entry occurring at a time $T+Dt$ in the data sequence based at least in part on the received entries in the data sequence received at the block 510. The first subsequent entry may be an entry occurring directly subsequent to the entries received of the block 510. Alternatively, the first subsequent entry may be an entry occurring at some point in time after the entries received at the block 510, but not necessarily the next entry in the data sequence. In some cases, the change in time represented by Dt may correspond to an amount of latency in the communication between the first instrument simulator 302A and the second instrument simulator 302N. In other cases, the change in time Dt may be associated with an amount of time between notes, an amount of desired buffer time to facilitate preventing or reducing latency, or any other amount of time in advance of receiving an entry in the data sequence that a user desires to have a predicted entry determined. In some cases, the change in time Dt may be a specific amount of time, which may be determined by a user or be based on the musical score, or may be determined as part of the prediction process performed by the sequence predictor 306A.

Predicting the first subsequent entry may include predicting the timing of a note in the musical sequence to be played by an instrument simulated by the second instrument simulator 302N. Alternatively, or in addition, predicting the first subsequent entry may include predicting a particular note to be played, a length of the note to be played, a style in which the note was to be played, or any other information associated with the playing of the note in the musical sequence. The sequence predictor 302A may predict the first subsequent entry using a machine learning based sequence predictor. In other words, the sequence predictor 302A may use a prediction function or parameter model generated by a model generation system 346 using a machine learning process to predict entries within the data sequence. In some cases, the first subsequent entry predicted at the block 512 may be provided to the sequence predictor 306A to help predict additional subsequent entries in the data sequence.

At decision block 514, the first instrument simulator 302A determines whether a first subsequent entry was received from the second instrument simulator 302N at a time T+Dt. In some cases, the decision block 514 determines whether the first subsequent entry was received at some threshold period of time prior to the time T+Dt. This threshold period of time may be sufficiently in advance of the time T+Dt such that the first instrument simulator 302A may use the predicted first subsequent entry to facilitate generating audio without a delay in the performance by the first instrument simulator 302A. For example, if the first instrument simulator 302A requires 10 ns, 2 ms, or some other period of time to generate the next note in the musical score, the threshold period of time may be set at 10 ns, 2 ms, or the period of time required to generate the next note, thereby ensuring that whether the next entry in the data sequence is received or is delayed, the performance of the musical score by the first instrument simulator 302A is not delayed.

If it is determined at the decision block 514 that a first subsequent entry was received from the second instrument simulator 302N at a time T+Dt, the process 500 proceeds to the block 516. At the block 516, the first instrument simulator 302A inserts the first subsequent entry received from the second instrument simulator 302N into the data sequence, or a copy of the data sequence at the first instrument simulator 302A. Inserting the first subsequent entry received from the second instrument simulator 302N into the data sequence may include using the first subsequent entry to facilitate predicting additional entries in the data sequence. Further, the first subsequent entry may be used by the first instrument simulator 302A to facilitate the performance of the musical score by the first instrument simulator 302A. For example, the first instrument simulator 302A may synchronize performance of a particular note (performed by the virtual musician 234A and/or virtual instrument 236A) with the performance of a note by the second instrument simulator 302N (performed by the virtual musician 234N and/or virtual instrument 236N) as determined based at least in part on the received first subsequent entry.

In some cases, the synchronization may be between a note played by the first instrument simulator 302A and a note associated with the first subsequent entry received from the second instrument simulator 302N. To account for transmission time, In some such cases, the note associated with the first subsequent entry may be a note scheduled to be played sometime in advance of a current note being played at the time the first subsequent entry is generated. In some cases, the synchronization may be between a note played by the first instrument simulator 302A and a note scheduled to be played some time after the note associated with the first subsequent entry received from the second instrument simulator 302N. In other words, the note associated with the first subsequent entry received from the second instrument simulator 302N may be used for timing purposes to synchronize performance of the musical score by the instrument simulators, but may not necessarily be the note that is being synchronized. In certain cases, this difference between the note to be synchronized and the note associated with the received subsequent entry in the data sequence permits a delay between the generation of a note and the transmission of timing information to exist without introducing latency into the performance of the musical score.

At block 518, the first instrument simulator 302A discards the predicted first subsequent entry predicted at the block 512. After completing the operations associated with the block 518, the process 500 may end. Alternatively, the process 500 may return to one or more of the blocks 510 and/or 512 where operations associated with the blocks 510 and/or 512 may be repeated. The operations may be repeated using an updated portion of the data sequence based at least in part on the first subsequent entry received and/or one or more additional entries in the data sequence received. In other words, in some cases, portions of the process 500 may be repeated using additional entries in the data sequence. Further, portions of the process 500 may be repeated until the performance selected at the block 502 is completed or otherwise halted.

If it is determined at the decision block 514 that a first subsequent entry was not received from the second instrument simulator 302N at a time T+Dt, the process 500 proceeds to the block 520 illustrated in FIG. 5B. At the block 520, the first instrument simulator 302A provides the predicted first subsequent entry in the data sequence to a virtual musician 234A and or to a virtual instrument 236A. In some cases, providing the predicted first subsequent entry to the virtual musician 234A and/or to the virtual instrument 236A may include providing information included in or encapsulated by the predicted first subsequent entry. For example, providing the predicted first subsequent entry to the virtual musician 234A may include providing predicted timing information for a note in the musical score performed by the second instrument simulator 302N.

At the block 522, the first instrument simulator 302A generates audio based at least in part on the predicted subsequent entry in the data sequence. Generating the audio based at least in part in the predicted subsequent entry in the data sequence may include timing the playing of a note or set of notes based on a predicted timing included in the predicted subsequent entry. Further, generating the audio based at least in part in the predicted subsequent entry may include playing a note or set of notes in a manner or style or with a particular tempo that is selected based at least in part on information included in the predicted subsequent entry. For example, if the predicted subsequent entry predicts that the instrument simulator 302N may play a set of notes in the musical score in a particular octave or with a particular tempo, the instrument simulator 302A may play a set of notes in the musical score in a matching octave or using a matching tempo.

In some cases, the audio generated at the block 522 may be output by a speaker for presentation to a user. Alternatively, or in addition, the generated audio may be recorded or stored in a memory, such as a non-volatile memory. Further, in some cases, the generated audio, or information associated with the generated audio, may be transmitted to other instrument simulators within the virtual orchestra system 104.

At the block 524, the first instrument simulator 302A inserts the predicted first subsequent entry into the data sequence to obtain a first updated sequence. The first updated sequence may be used to predict a second subsequent entry, which may or may not be used by the instrument simulator 302A in performing the musical score depending on whether one or more additional entries in the data sequence are received within a particular timeframe. In some cases, a first set of additional predicted entries in the data sequence may be discarded and a second set of additional entries may be predicted based on a receipt of further entries in the data sequence.

At the block 526, the first instrument simulator 302A receives a first subsequent entry from the second instrument simulator 302N.

At the block 528, the first instrument simulator 302A replaces the predicted first subsequent entry with the received first subsequent entry in the first updated sequence to obtain a second updated sequence. In some cases, portions of the musical score already performed by the first instrument simulator 302A may not be replaced or re-performed based on receipt of the first subsequent entry. However, receipt of the first subsequent entry may be used to facilitate performing predictions of later entries within the data sequence. In some cases, the second updated sequence may be used by the model generation system 346 to refine or update one or more sequence predictors.

After completing the operations associated with the block 528, the process 500 may end. Alternatively, the process 500 may return to one or more of the blocks 510 and/or 512 where operations associated with the blocks 510 and/or 512 may be repeated. The operations may be repeated using an updated portion of the data sequence (e.g., the second updated sequence, or an updated sequence based on additional received entries in the data sequence). In other words, in some cases, portions of the process 500 may be repeated using additional entries in the data sequence. Further, portions of the process 500 may be repeated until the performance selected at the block 502 is completed or otherwise halted.

Advantageously, certain aspects of the present disclosure enable communication latency between different aspects of a distributed system, such as a distributed virtual orchestra system, to be reduced or eliminated by the use of artificial intelligence or machine learning based prediction. In some cases, the predictions are imprecise. However, it is often desirable to act upon imprecise or incorrect predictions than it is to halt or pause a process to ensure accurate data. For example, when performing a musical score using a virtual orchestra, it is often preferable for the timing of a note to be slightly out of sequence than it is to halt performance of the musical score, and consequently have a greater deficiency in timing between notes. Similarly, it is often desirable to have a first user on a first user's display see a second user's character in a video game continue to act in a predicted manner, even if inaccurate (e.g., continue walking in a particular direction rather than turn or jump as may have been the correct action in one example use case), than it is to have perceived lag due to a delay in receiving data from the second user's computer.

Example Timing Diagram

Figure 6:
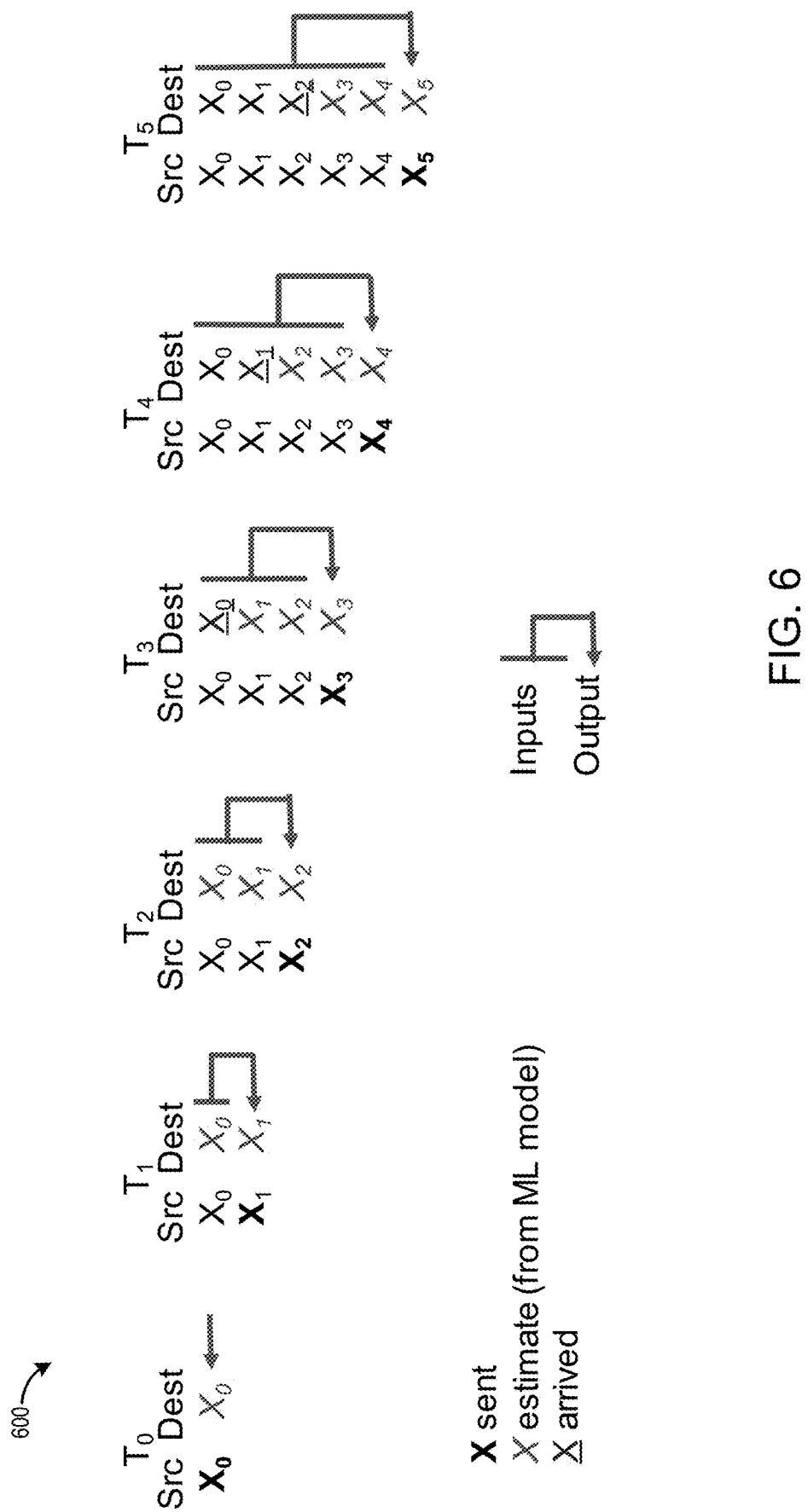
FIG. 6 is an example timing diagram in accordance with certain aspects of the present disclosure.

FIG. 6 is an example timing diagram 600 in accordance with certain aspects of the present disclosure. The timing diagram illustrated communication between a source computing systems and a destination computing system. The destination may be a first instrument simulator 302A and the source may be a second instrument simulator 302N. The entry in the data sequence sent at a time T by the source to the destination is represented by the bolded 'X'. The predicted or estimated entry in the data sequence at the time T is represented by the italicized 'X'. The entry associated with the time T that is received at the destination is represented by the underlined 'X'. At each point in time, the arrow represents the current data packet being processed to generate an output (e.g., a note being played or recorded), and the vertical line connected to the arrow represents the inputs being provided to a prediction function to predict a next entry in the data sequence.

At time $T_0$, an entry in a data sequence (e.g., data packets corresponding to a sequence of played musical notes, data packets corresponding to a sequence of graphical images, and the like) may be transmitted from the source computing system to the destination computing system. Due to transmission time between the source and the destination, the data packet may not be received until some later time. For example, the data packet $X_0$ transmitted at time $T_0$ may not be received until time $T_3$. Accordingly, at time $T_0$, the destination computing system may use a prediction function generated using a machine learning model to predict the entry $X_0$ in the data sequence. At times $T_1$ and $T_2$, two more entries in the sequence may be transmitted from the source computing system to the destination computing system and two more entries may be predicted in the data sequence at the destination computing system.

At time $T_2$, the destination computing system has yet to receive any of the entries transmitted by the source computing system to the destination computing system. Thus, to prevent any pause in the generated output by the destination computing system and to continue to maintain synchronicity between the outputs of the source and destination computing systems, the destination computing system may use predicted entries in the data sequence being generated by the source computing system to continue generating an output. It should be understood that the destination computing system may also be a source computing system. Thus, the output of the source computing system may be based at least in part on the data sequence provided by the destination computing system, or a prediction of the data sequence provided by the destination computing system.

At time $T_3$, the initial entry in the data sequence generated by the source arrives at the destination. As the destination is already generating an output three entries later, the received entry $\underline{X_0}$ may not be used to generate a corresponding output at time $T_0$ as time $T_0$ has elapsed. However, the previously predicted entry $X_0$ used at times $T_0$-$T_2$ may be replaced with the receiving entry $\underline{X_0}$ for use by a prediction function to predict later-occurring entries in the data sequence. For example, at time $T_4$, the received entry $\underline{X_0}$ may be used, along with additional entries $\underline{X_1}$-$\underline{X_3}$ to help predict entry $X_4$. Further, entry $\underline{X_1}$ may be received at time $T_4$ and may replace previously predicted entry $X_1$. At time $T_5$, the process may be repeated with newly received entry $\underline{X_2}$ replacing previously predicted entry $X_2$.

Example Model Generation System

Figure 7:
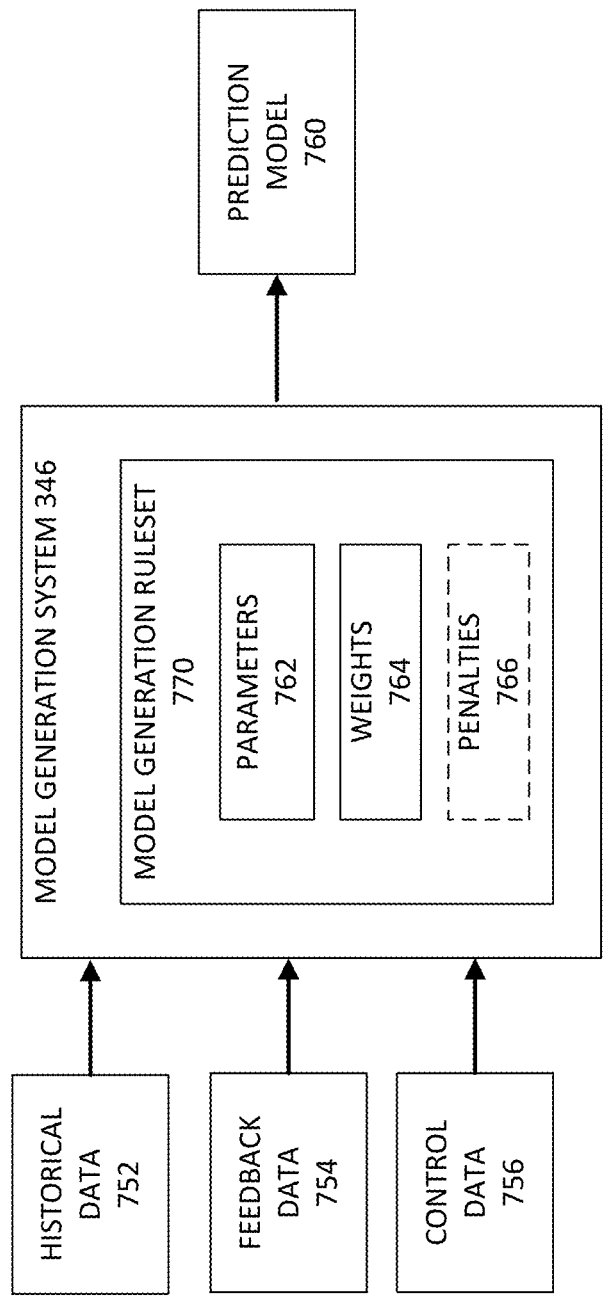
FIG. 7 illustrates an example of the model generation system of FIG. 3 in accordance with certain aspects of the present disclosure.

FIG. 7 illustrates an example of the model generation system 346 of FIG. 3 in accordance with certain aspects of the present disclosure. The model generation system 346 may be used to determine one or more prediction models 760 based on historical data 752. The historical data may include past occurrences relating to the desired predictions. For example, in the context of playing musical scores using a virtual orchestra, the historical data may include past performances of the musical score and/or of other musical scores. In some cases, the historical data may be associated with particular users that interacted with the virtual orchestra system to generate one or more performances of one or more musical scores.

Typically, although not necessarily, the historical data 752 includes data associated with a large number of occurrences of events corresponding to the types of events to be predicted. For example, the historical data may include hundreds, thousands, hundreds of thousands, or more instances of events (e.g. performances of musical scores, or occurrences of multiplayer video games, or users interacting with the virtual orchestra system). However, the present disclosure is not limited as such, and the number of events or associated users may include any number of events or users. Further, the historical data 752 can include data received from one or more data sources, such as, for example, one or more virtual orchestra systems and/or one or more user devices 150 interacting with virtual orchestra systems and/or hosting instances of a video game. Further, the historical data 752 can include data from different data sources, different data types, and any data generated based on performance of a musical score using a virtual orchestra system 104.

In some cases, the historical data 752 may include a very large number of data points, such as millions of data points, which may be aggregated into one or more data sets. In some cases, the historical data 752 may be accessed from a data repository (not shown). In some cases, the historical data 752 is limited to historical information or messages associated with a particular virtual orchestra system, musical score, or video game, but in other embodiments, the historical data 752 may include information from one or more virtual orchestra systems, musical scores, or video games. In some cases, the other musical scores or video games are similar (for example, the same genre, the same theme, the same or similar types of objectives, and the like). In other cases, the musical scores or video games that provide the historical data 752 are not limited in type or similarity. Further, in some embodiments, one or more subsets of the historical data may be limited by a date restriction, such as for example, limited to include only data from the last 6 months, data that is between 3-6 months old, or data less than a year old.

The model generation system 346 may, in some cases, also receive feedback data 754. This data may be received as part of a supervised model generation process that enables a user, such as an administrator, to provide additional input to the model generation system 346 that may be used to facilitate generation of the prediction model 760. For example, if an anomaly exists in the historical data 752, the user may tag the anomalous data enabling the model generation system 346 to handle the tagged data differently, such as by applying a different weight to the data or excluding the data from the model generation process.

Further, the model generation system 346 may receive control data 756. This control data 756 may identify one or more features or characteristics for which the model generation system 346 is to determine a model. Further, in some cases, the control data 756 may indicate a value for the one or more features identified in the control data 756. For example, suppose the control data 756 indicates that a prediction model is to be generated using the historical data 752 to determine a timing of playing particular notes in a musical score by a particular virtual instrument. If the timing is known for the particular virtual instrument playing the particular notes of the musical score, this data may be provided as part of the control data 756, or as part of the historical data 752.

The model generation system 346 may generally include a model generation rule set 770 for generation of the prediction model 760. The rule set 770 may include one or more parameters 762. Each set of parameters 762 may be combined using one or more mathematical functions to obtain a parameter function. Further, one or more specific parameters may be weighted by the weights 764. In some cases, the parameter function may be obtained by combining a set of parameters with a respective set of weights 764. The prediction model 760 and/or the respective parameters 762 of the prediction models 760 may be derived during a training process based on particular input data, such as the historical data 752, feedback data 754, and control data 756, and defined output criteria, which may be included with the control data 756, used for training purposes. The model generation rule set 770 can define the specific machine learning rules and/or algorithms the model generation system 746 uses to generate the model based on a defined objective function, such as determining timing for playing certain notes by certain virtual instruments. In some embodiments, initial parameters 762 and weights 764 can be manually provided during the initiation of the model generation process. The parameters 762 and weights 764 can be updated and modified during the model generation phase to generate the prediction model 760.

The model generation system 346 can filter and categorize the historical data sets according to various characteristics and parameters of the data. For example, the data can be categorized by the data source (such as, for example, virtual orchestra system data, virtual instrument data, game application data, host application data, or user profile data), information type (such as, for example, musical scores, genres, instruments, tempo, octaves, virtual music halls, etc.), or other categories associated with the data. The model generation system 346 can filter the information to identify the information for further processing. In some embodiments, the model generation system 346 is configured to filter and separate the historical data 752 into a plurality of data types or categories before further processing. Moreover, in some cases, some of the historical data 752 may be filtered out or removed from the historical data 752 based on the data being associated with a relevance that does not satisfy a threshold relevance as determined by the model generation system 346.

Optionally, one or more of the prediction models 760 may be associated with a penalty 766. These penalties 766 may be used to facilitate the generation of or selection of a particular prediction model 760 based on one or more factors that are used to derive the penalty. For example, the mathematical complexity or the number of parameters included in a particular prediction model 760 may be used to generate a penalty for the particular prediction model 760, which may impact the generation of the model and/or a selection algorithm or a selection probability that the particular prediction model 760 is selected.

After the prediction model 760 has been generated, the model can be used during runtime of a sequence predictor 306A-N, 308, or a virtual orchestra system 104 that includes a sequence predictor to determine a predicted value or entry in a data sequence associated with playing a musical score. For example, the model can be used to predict a timing of a note, the length of the note, the specific note, the octave of the note, the tempo of the note, and the like. In some cases, different predictions may be made for the same note in the same musical score, but for different instruments playing the note.

In certain embodiments, the model generation system 346 may be used to generate a particular prediction model associated with a particular virtual instrument or virtual musician. To generate the particular prediction model, the model generation system 346 may be presented with a set of instrument-based training data associated with the particular virtual instrument type of virtual musician type. The set of instrument-based training data may be supplied to the model generation system 346 as training data in place of or in addition to the historical data 752.

In certain embodiments, the prediction model 760 generated based at least on the historical data 752 may be provided as an input to the model generation system 346 as a default starting model for determining a sequence predictor or a prediction model to be executed by a sequence predictor for a particular virtual instrument. As the sequence predictor is used to facilitate synchronization among different instruments playing a musical score, the prediction model 760 supplied to a particular instrument simulator may be associated with a different instrument than the virtual instrument simulated by the instrument simulator.

Example Sequence Predictor

Figure 8:
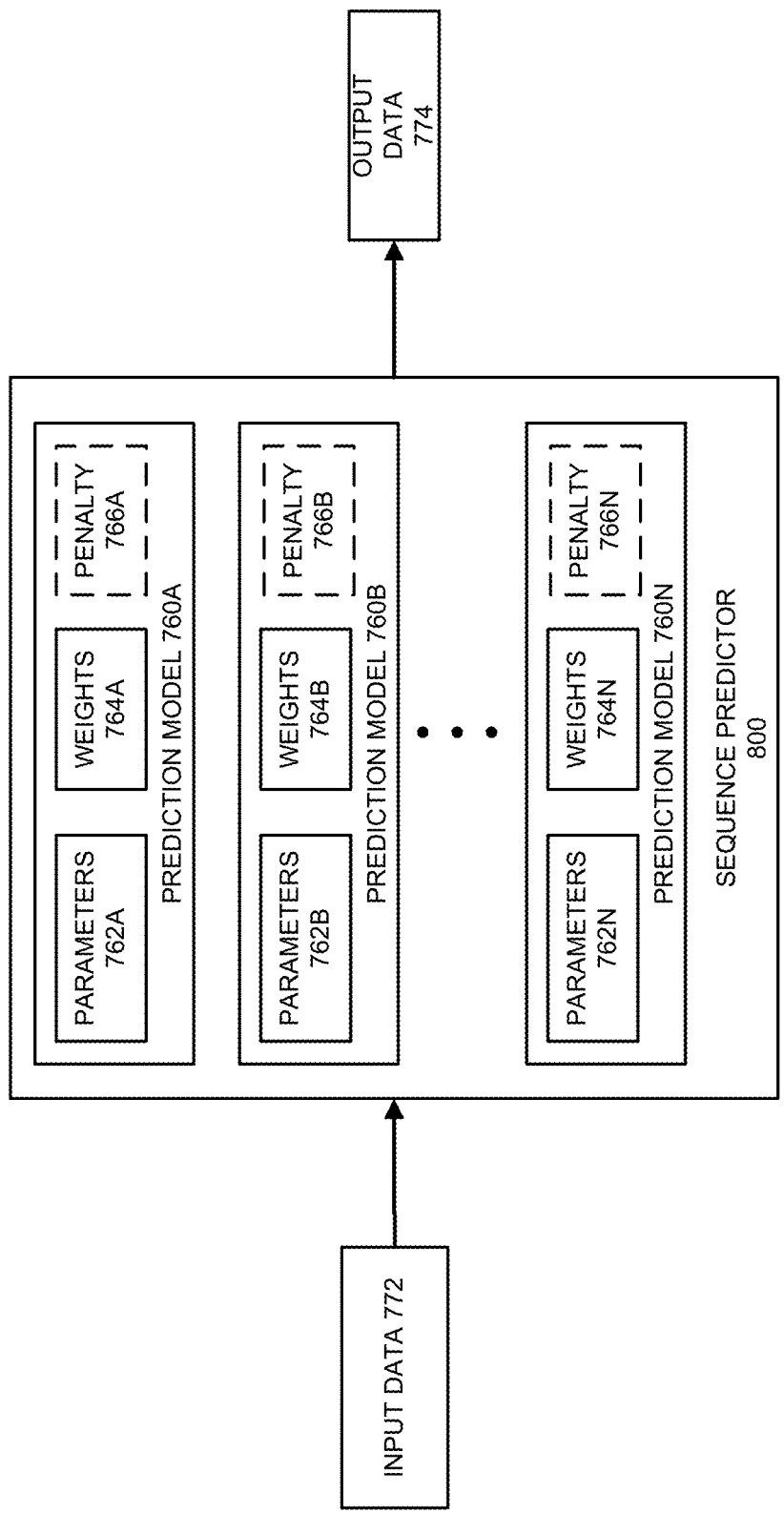
FIG. 8 illustrates an example of a sequence predictor in accordance with certain aspects of the present disclosure.

FIG. 8 illustrates an example of a sequence predictor 800 in accordance with certain aspects of the present disclosure. The sequence predictor 800 can be or can include any of the previously described sequence predictors 306A-N, 308. The sequence predictor 800 may use one or more prediction models 760A, 760B, 760N (which may be referred to collectively as "prediction models 760" or in the singular as "prediction model 760") to process the input data 772 to obtain the output data 774. The prediction models 760 may also be referred to as parameter models.

In some aspects, at least some of the prediction models 760 may be associated with different musical scores, virtual musicians, virtual instruments, users, context information, video games, or other applications that may be interdependent or otherwise synchronized using the aspects described herein. In certain aspects, a musical score, virtual musician, virtual instrument, or user may be associated with multiple prediction models. For example, a user may be associated with prediction model 760A and 760B. Continuing the previous example, the sequence predictor 800 may use the prediction model 760A when a first musical score is played or when a virtual instrument of a first type plays the musical score (or the portion of the musical score written for instruments of the first type) and may use the prediction model 760B when a second musical score is played or when a virtual instrument of a second type plays the musical score (or the portion of the musical score written for instruments of the second type).

The sequence predictor 800 may apply the prediction model(s) 760 upon selection of a musical score, or identification of an application on a first computing system that is to be synchronized with a portion of the application or another instance of the application executing on a second computing system. In some aspects, the sequence predictor 800 may be applied after each entry, or set of entries, in a musical or data sequence is received. Alternatively, or in addition, the sequence predictor 800 may be applied continuously or intermittently on a scheduled basis. For example, the sequence predictor 800 may be applied every second, 5 seconds, 10 ms, or 50 ns, any time between the foregoing, or after any other amount of time has elapsed. During prediction of a subsequent or later entry in the music or data sequence, the sequence predictor 800 receives input data 772 that can be applied to one or more of the prediction models 760. In some cases, the input data 772 can be filtered before it is provided to the sequence predictor 800. The input data may be filtered to remove data that is beyond an age threshold or that may not be relevant to a selected sequence predictor 800.

The input data 772 can include one or more prior entries in the music or data sequence. The prior entries may include prior received entries in the music or data sequence and/or previously predicted entries in the music or data sequence. Further, the input data 772 can include additional data that may facilitate predicting the next or a later entry in the music or data sequence. This additional input data 772 may include user data, context data, video game data, and any other data that may modify the prediction of a later entry in a music or data sequence, or the timing of a later entry in the music or data sequence.

The context data can include any data that provides additional context to the musical score being played or to the application being synchronized across multiple computing systems. For example, the context data may include preferred play style of a user, the skill of the users playing the video game or application, the desired octave of the musical score, the desired tempo of the musical score, the types of virtual instruments to play the musical score, and the like.

The video game or application data may include any data that relates to the video game or application itself, or the user computing systems hosting instances of the video game or application. For example, the video game data may include a genre of the video game, the type of computing systems hosting the video game or application (for example, a portable computing system, a desktop computing system, a smart phone, a game console, and the like), the speed of the network connection between the computing systems, and the like.

In some embodiments, a single prediction model 760 may exist for the sequence predictor 800. However, as illustrated, and described above, it is possible for the sequence predictor 800 to include multiple prediction models 760. The sequence predictor 800 can determine which prediction model, such as any of models 760A-N, to use based on input data 772 and/or additional identifiers associated with the input data 772, such as an identity of the user, an identity of the musical score, an identity of the virtual instrument playing the musical score, or an identity of the video game. Additionally, the selection of a prediction model 760 may be based on the specific input data 772 provided. The availability of particular types of data as part of the input data 772 can affect the selection of the prediction model 760. For example, the inclusion of demographic data (for example, age, gender, first language) for a user conducting the virtual orchestra as part of the input data may result in the use of prediction model 760A. However, if demographic data is not available for a particular user, then prediction model 760B may be used instead.

As mentioned above, one or more of the prediction models 760 may have been generated with or may be associated with a penalty 766. The penalty may be used to impact the generation of the model or the selection of a prediction model for use by the sequence predictor 800.

The output data 774 can be a prediction of a subsequent or later entry in a musical sequence or in a data sequence.

Alternatively, or in addition, the output data 774 may be a prediction of a timing of a subsequent or later entry in the musical sequence or the data sequence. This prediction may be a probability that the entry or timing of the entry in the music or data sequence is of a particular value or timing. For example, in some cases, a subsequent entry may be known based on the previously provided identity of the musical score. However, the timing of the subsequent entry may vary based on input by the user conducting the musical score. This timing may be predicted as a probability that the entry associated with a particular virtual instrument occurs at a certain time or a certain time after an earlier entry in the music or data sequence.

The prediction models 760A, 760B, 760N may generally include a set of one or more parameters 762A, 762B, 762N, respectively (which may be referred to collectively as "parameters 762"). Each set of parameters 762 (such as parameters 762A) may be combined using one or more mathematical functions to obtain a parameter function. Further, one or more specific parameters from the parameters 762A, 762B, 762N may be weighted by the weights 764A, 764B, 764N (which may be referred to collectively as "weights 764"). In some cases, the parameter function may be obtained by combining a set of parameters (such as the parameters 762A) with a respective set of weights 764 (such as the weights 764A). Optionally, one or more of the prediction models 760A, 760B, 760N may be associated with a penalty 766A, 766B, 766N, respectively (which may be referred to collectively as "penalties 766").

Example Machine Learning Process

Figure 9:
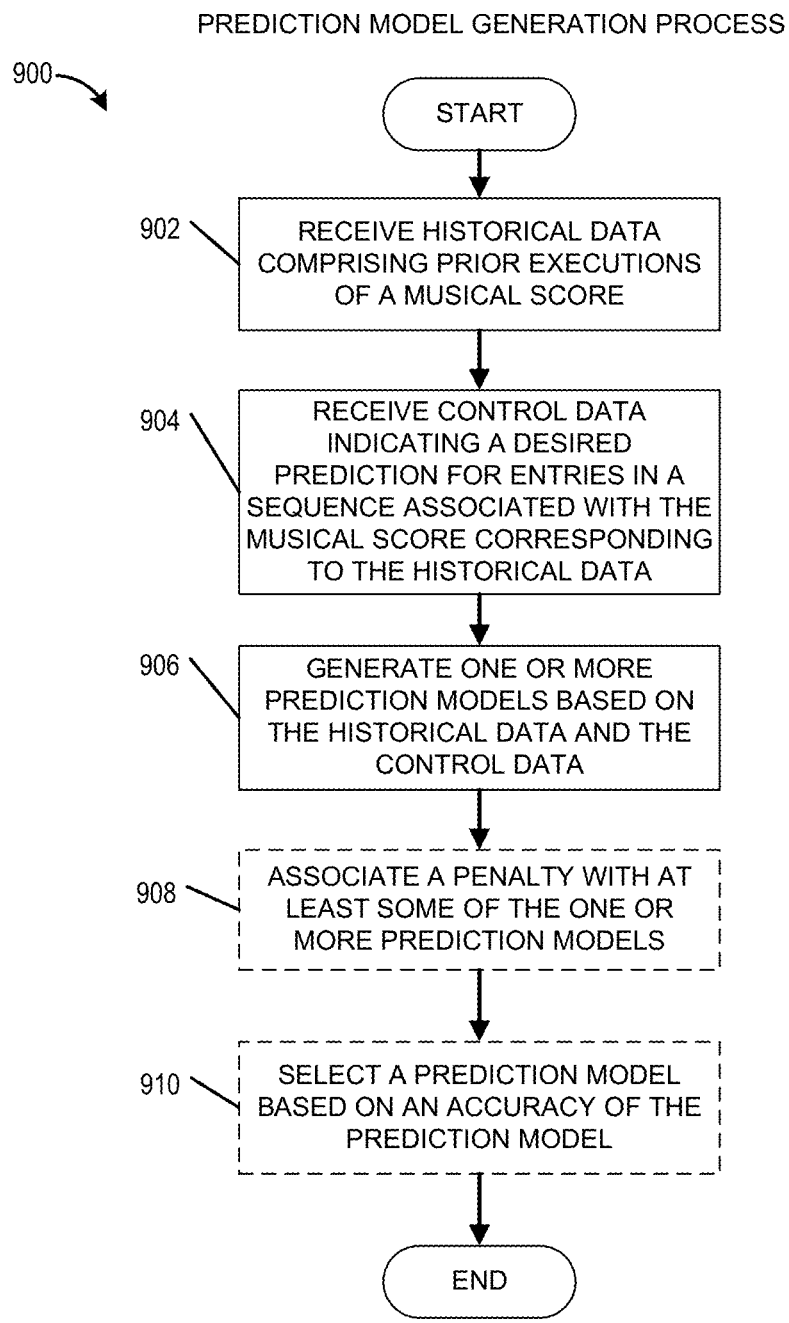
FIG. 9 presents a flowchart of an example of a prediction model generation process in accordance with certain aspects of the present disclosure.

FIG. 9 presents a flowchart of an example of a prediction model generation process in accordance with certain aspects of the present disclosure. The process 900 can be implemented by any system that can generate one or more parameter functions or prediction models that include one or more parameters. In some cases, the process 900 serves as a training process for developing one or more parameter functions or prediction models based on historical data or other known data. The process 900, in whole or in part, can be implemented by, for example, a user device 150, a sequence predictor 800, a model generation system 346, or a virtual orchestra system 104, among others. Although any number of systems, in whole or in part, can implement the process 900, to simplify discussion, the process 900 will be described with respect to particular systems. Further, it should be understood that the process 900 may be updated or performed repeatedly over time. For example, the process 900 may be repeated once per month, with the addition or performance of a new musical score, with the generation of or access to an additional set of training data, or with the addition of a threshold number of new users available for analysis or who are interacting with the virtual orchestra system 104. However, the process 900 may be performed more or less frequently.

The process 900 begins at block 902 where the model generation system 346 receives historical data 752 comprising prior execution of a musical score. In some cases, the historical data 752 may include prior executions of more than one musical scores. In other cases, the historical data 752 may include prior interactions with other applications, such as video games or educational applications. The historical data 752 may include timing or tempo information relating to prior performances of one or more musical scores.

The historical data 752 may serve as training data for the model generation system 346. Generally, the historical data 152 may be for a plurality of users' interaction with the virtual orchestra system 104 and/or a plurality of performances of one or more musical scores. In some cases, the historical data 752 may be related to a single user and/or a single musical score. In some cases, the historical data 752 may be for a single virtual instrument or for a plurality of virtual instruments playing the musical score. For example, the process 900 may be used to generate a user-specific prediction model and/or a musical score-specific prediction function.

At block 904, the model generation system 346 receives control data 756 indicating a desired prediction for entries in a sequence associated with a musical score corresponding to the historical data. This control data 756 may indicate one or more features or characteristics for which the model generation system 346 is to determine a model. Alternatively, or in addition, the control data 756 may include a value for the features or characteristics that are associated with the received historical data 752.

For example, the control data 756 may identify a timing of each note played in a musical sequence, a tempo for notes played in the musical sequence, an octave of the notes in the musical sequence, the subsequent notes played in the musical sequence, as the desired feature to be predicted by the model that is to be generated by the model generation system 346.

At block 906, the model generation system 346 generates one or more prediction models 760 based on the historical data 752 and the control data 756. The prediction models 760 may include one or more variables or parameters 762 that can be combined using a mathematical algorithm or model generation ruleset 770 to generate a prediction model 760 based on the historical data 752 and, in some cases, the control data 756. Further, in certain embodiments, the block 906 may include applying one or more feedback data 754. For example, if the prediction model 760 is generated as part of a supervised machine learning process, a user (for example, an administrator) may provide one or more inputs to the model generation system 346 as the prediction model 760 is being generated and/or to refine the prediction model generation process. For example, suppose a supervisor of the machine learning process is aware that an instance of the musical score is being prepared for a fast-paced video-game or an action movie. In such a case, the supervisor may supply feedback data 754 to increase the weight of a portion of the historical data 752 that may correspond to fast tempo music to generate a prediction function to be used with musical scores that are to be played with a fast tempo. Similarly, the supervisor may supply feedback data 754 to decrease the weight of the portion of the historical data 752 that corresponds to slow tempo music.

In some cases, one or more of the variables or parameters may be weighted using, for example, weights 764. The value of the weight for a variable may be based at least in part on the impact the variable has in generating the prediction model 760 that satisfies, or satisfies within a threshold discrepancy, the control data 756 and/or the historical data 752. In some cases, the combination of the variables and weights may be used to generate a prediction model 760. In some cases, certain types of data may be considered more valuable than other types of data and may therefore be weighted more heavily. For example, timing or tempo data may be may be weighted more heavily than data relating to the octave of the notes.

Optionally, at block 908, the model generation system 346 applies a penalty 766 to or associates a penalty 766 with at least some of the one or more prediction models 760 generated at block 906. The penalty associated with each of the one or more prediction models 760 may differ. Further, the penalty for each of the prediction models 760 may be based at least in part on the model type of the prediction model 760 and/or the mathematical algorithm used to combine the parameters 762 of the prediction model 760, and the number of parameters included in the parameter function. For example, when generating a prediction model 760, a penalty may be applied that disfavors a very large number of variables or a greater amount of processing power to apply the model. As another example, a prediction model 760 that uses more parameters or variables than another prediction model may be associated with a greater penalty 766 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

The model generation system 346, at block 910, based at least in part on an accuracy of the prediction model 760 and any associated penalty, selects a prediction model 760. In some embodiments, the model generation system 346 selects a prediction model 760 associated with a lower penalty compared to another prediction model 760. However, in some embodiments, the model generation system 346 may select a prediction model associated with a higher penalty if, for example, the output of the prediction model 760 is a threshold degree more accurate than the prediction model associated with the lower penalty. In certain embodiments, the block 910 may be optional or omitted. For example, in some cases, the prediction models 760 may not be associated with a penalty. In some such cases, a prediction model may be selected from a plurality of prediction models based on the accuracy of the output generated by the prediction model.

Example User Computing Device

Figure 10:
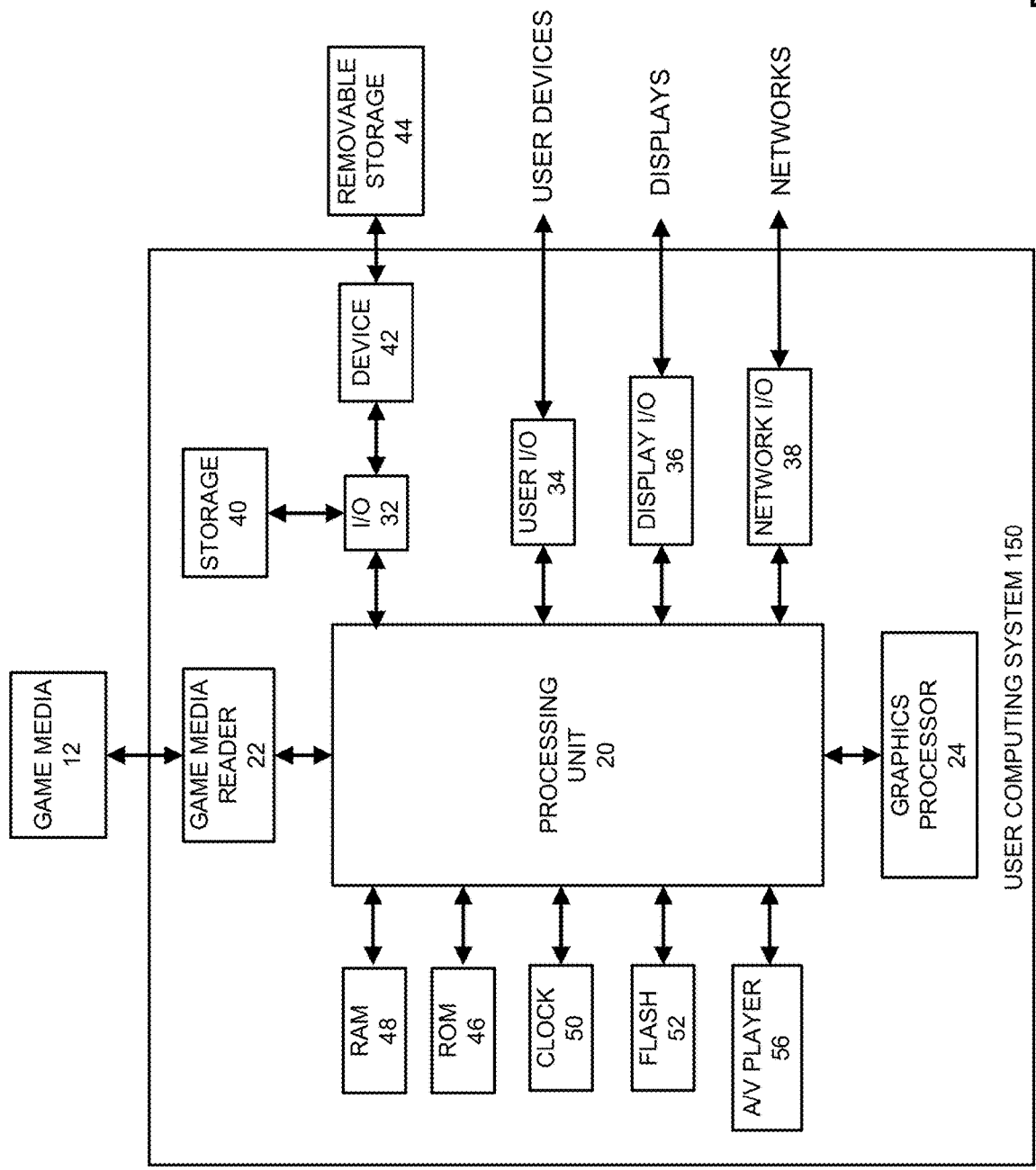
FIG. 10 illustrates an example of a hardware configuration for a user device in accordance with certain aspects of the present disclosure.

FIG. 10 illustrates an example of a hardware configuration for a user computing system or user device 150 in accordance with certain aspects of the present disclosure. Other variations of the user device 150 may be substituted for the examples explicitly presented herein, such as removing or adding components to the user device 150. The user device 150 may include a dedicated game device, a smart phone, a tablet, a personal computer, a desktop, a laptop, a smart television, a car console display, a dedicated orchestra simulator, and the like. Further, (although not explicitly illustrated in FIG. 10), the user device 150 may optionally include a touchscreen display, a touchscreen interface, a motion capture interface, or any other type of interface that may detect movement of a conductor baton by a user. The user device 150 may also be distributed across multiple geographical locations. For example, the user device 150 may be a cluster of cloud-based servers.

As shown, the user device 150 includes a processing unit 20 that interacts with other components of the user device 150 and also components external to the user device 150. A game media reader 22 may be included that can communicate with game media 12. Game media reader 22 may be an optical disc reader capable of reading optical discs, such as CD-ROM or DVDs, or any other type of reader that can receive and read data from game media 12. In some aspects, the game media reader 22 may be optional or omitted. For example, game content or applications may be accessed over a network via the network I/O 38 rendering the game media reader 22 and/or the game media 12 optional. In some cases, the game media reader 22 may include or be substituted with music media reader.

The user device 150 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user device 150 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user device 150 may also include various components for enabling input/output, such as an I/O 32, a user I/O 34, a display I/O 36, and a network I/O 38. As previously described, the input/output components may, in some cases, including touch-enabled devices. Alternatively, or in addition, the input/output components may include various motion-capture input devices and/or cameras that can detect motion of a user or an object (e.g., a conductor baton) held by the user. The I/O 32 may interact with storage element 40 and, through a device 42, removable storage media 44 in order to provide storage for computing device 110. Processing unit 20 can communicate through I/O 32 to store data, such as game state data and any shared data files. In addition to storage 40 and removable storage media 44, computing device 110 may also include ROM (Read-Only Memory) 46 and RAM 48. RAM 48 may be used for data that is accessed frequently, such as when a game is being played.

User I/O 34 may be used to send and receive commands between processing unit 20 and user devices, such as game controllers. In some cases, the user I/O 34 can include touchscreen inputs. The touchscreen can be a capacitive touchscreen, a resistive touchscreen, or other type of touchscreen technology that is configured to receive user input through tactile inputs from the user. Display I/O 36 may provide input/output functions that can be used to display images from a game being played or from musical score being performed. For example, the display I/O 36 may display representations of notes being played or images of a virtual musician playing a virtual instrument. Network I/O 38 may be used for input/output functions for a network. Network I/O 38 may be used during execution of a game, such as when a game is being played online or being accessed online, or during communication between instrument simulators of different instances of virtual instruments, such as when a musical score is being played by a virtual orchestra, or other grouping of virtual musicians.

Display output signals may be produced by the display I/O 36 and can include signals for displaying visual content produced by the user device 150 on a display device, such as graphics, user interfaces, video, and/or other visual content. The user device 150 may comprise one or more integrated displays configured to receive display output signals produced by the display I/O 36, which may be output for display to a user. According to some embodiments, display output signals produced by the display I/O 36 may also be output to one or more display devices external to the user device 150.

The user device 150 can also include other features that may be used with a video game or virtual orchestra, such as a clock 50, flash memory 52, and other components. An audio/video player 56 might also be used to play a video sequence, such as a movie. It should be understood that other components may be provided in the user device 150 and that a person skilled in the art will appreciate other variations of the user device 150. Further, it should be understood that other computing elements described herein may be configured similarly or have some or all of the components of the user device 150. For example, some or all of the instrument simulators 302A-302N or the music hall simulator 304 may have one or more elements of the user device 150.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user device 150 is turned off or loses power.

As user computing system 110 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
    as implemented by an interactive computing system configured with specific computer-executable instructions,
        receiving, from a user device, a request to generate output associated with a musical performance, wherein the request includes a performance identifier corresponding to the musical performance;
        selecting a sequence predictor based at least in part on the performance identifier;
        receiving, from an instrument simulator configured to perform the musical performance, a first entry in a musical sequence corresponding to the musical performance, wherein the first entry occurs at or prior to a first time period;
        using the sequence predictor, determining a predicted second entry in the musical sequence based at least in part on the first entry in the musical sequence, the predicted second entry associated with a second time period later than the first time period;
        generating, at the second time period, an audio output based at least in part on the predicted second entry in the musical sequence;
        adding the predicted second entry in the musical sequence to the first entry in the musical sequence to obtain a first sequence; and
        using the sequence predictor, determining a first one or more additional predicted entries in the musical sequence based at least in part on the first sequence.

2. The computer-implemented method of claim 1, wherein the predicted second entry comprises a musical note that is predicted to be generated by the instrument simulator.

3. The computer-implemented method of claim 1, wherein the predicted second entry comprises a predicted timing of a musical note to be generated by the instrument simulator.

4. The computer-implemented method of claim 1, wherein the first entry in the musical sequence is part of a first set of entries in the musical sequence, and wherein the sequence predictor determines the predicted second entry based at least in part on the first set of entries.

5. The computer-implemented method of claim 1, further comprising:
    receiving, from the instrument simulator, a second entry in the musical sequence, wherein the second entry is associated with the second time period and is received at a third time period that is later than the second time period;
    replacing the predicted second entry in the first sequence with the second entry received from the instrument simulator to obtain a second sequence; and
    using the sequence predictor, determining a second one or more additional predicted entries in the musical sequence based at least in part on the second sequence.

6. The computer-implemented method of claim 1, wherein
    each predicted entry from the first one or more additional predicted entries is added to the first sequence.

7. The computer-implemented method of claim 1, wherein the instrument simulator is implemented on a computing system that is separate from the interactive computing system, and wherein the interactive computing system comprises a second instrument simulator.

8. The computer-implemented method of claim 1, wherein the sequence predictor comprises a prediction model generated by applying a set of training data to a model generation system that implements machine learning algorithm.

9. The computer-implemented method of claim 1, further comprising:
    receiving context information associated with the musical performance, wherein the context information corresponds to a change in the audio output; and
    modifying the sequence predictor based at least in part on the context information.

10. The computer-implemented method of claim 1, further comprising:
    using the sequence predictor, determining a predicted third entry in the musical sequence based at least in part on the first entry in the musical sequence, the predicted third entry associated with a third time period later than the first time period;
    receiving, from the instrument simulator, a third entry in the musical sequence, wherein the third entry is associated with the third time period and is received within a threshold time prior to the third time period; and
    generating, at the third time period, a second audio output based at least in part on the third entry in the musical sequence and without using the predicted third entry.

11. The computer-implemented method of claim 10, further comprising discarding the predicted third entry in the musical sequence.

12. The computer-implemented method of claim 1, further comprising generating the audio output by at least:
    applying the predicted second entry to a physical model of a particular instrument at the second time period; and
    causing the physical model to play a musical note determined to be played at the second time period based at least in part on the musical performance corresponding to the musical identifier.

13. The computer-implemented method of claim 1, wherein generating the audio output based at least in part on the predicted second entry in the musical sequence synchronizes the audio output with a second audio output generated by the instrument simulator, and wherein the instrument simulator is implemented on a separate computing system from the interactive computing system.

14. A system comprising:
an electronic data store configured to store sequence predictors that predict one or more data items within sequences of data items; and
a hardware processor of a first computing system in communication with the electronic data store, the hardware processor configured to execute specific computer-executable instructions to at least:
  receive a request to generate output associated with a first application;
  select a sequence predictor from the electronic data store based at least in part on the request;
  receive, from a second computing system, a first entry in a data sequence to be synchronized with the output of the first application, wherein the first entry occurs at or prior to a first time period;
  use the sequence predictor to determine a predicted second entry in the data sequence based at least in part on the first entry in the data sequence, the predicted second entry associated with a second time period later than the first time period;
  generate, at the second time period, a first output based at least in part on the predicted second entry in the data sequence;
  add the predicted second entry in the data sequence to the first entry in the data sequence to obtain a first sequence; and
  use the sequence predictor to determine an additional predicted entry in the data sequence based at least in part on the first sequence.

15. The system of claim 14, wherein the first entry is generated by a second application hosted by the second computing system.

16. The system of claim 15, wherein the second application is a second instance of the first application.

17. The system of claim 14, wherein the output comprises one or more of audio output, visual output, or haptic output, and wherein the first application comprises at least one of a video game, an instrument simulator, a virtual orchestra, an educational application, or a content streaming application.

18. The system of claim 14, wherein the hardware processor is further configured to execute specific computer-executable instructions to at least:
  receive, from the second computing system, a second entry in the data sequence, wherein the second entry is associated with the second time period and is received at a third time period that is later than the second time period;
  replace the predicted second entry in the first sequence with the second entry received from the second computing system to obtain a second sequence; and
  use the sequence predictor to determine a second additional predicted entry in the data sequence based at least in part on the second sequence.

19. The system of claim 14, wherein the hardware processor is further configured to execute specific computer-executable instructions to at least:
  use the sequence predictor to determine a predicted third entry in the data sequence based at least in part on the first entry in the data sequence, the predicted third entry associated with a third time period later than the first time period;
  receive, from the second computing system, a third entry in the data sequence, wherein the third entry is associated with the third time period and is received within a threshold time prior to the third time period; and
  generate, at the third time period, a second output based at least in part on the third entry in the data sequence.

20. The system of claim 19, wherein the hardware processor is further configured to execute specific computer-executable instructions to at least:
  discard the predicted third entry in the data sequence; and
  use the sequence predictor to determine a predicted fourth entry in the data sequence based at least in part on the third entry in the data sequence.

* * * * *